United States Patent
Armstrong

(10) Patent No.: US 10,318,142 B2
(45) Date of Patent: Jun. 11, 2019

(54) NAVIGATING EVENT INFORMATION

(71) Applicant: Google LLC, Mountain View, CA (US)

(72) Inventor: Charles Armstrong, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 276 days.

(21) Appl. No.: 15/081,872

(22) Filed: Mar. 26, 2016

(65) Prior Publication Data

US 2016/0283076 A1    Sep. 29, 2016

Related U.S. Application Data

(60) Provisional application No. 62/139,348, filed on Mar. 27, 2015.

(51) Int. Cl.
G06F 3/0485 (2013.01)
G06F 16/9038 (2019.01)

(52) U.S. Cl.
CPC ........ G06F 3/0485 (2013.01); G06F 16/9038 (2019.01)

(58) Field of Classification Search
CPC ................................................... G06F 3/0485
See application file for complete search history.

(56) References Cited

U.S. PATENT DOCUMENTS

| | | |
|---|---|---|
| D522,528 S | 6/2006 | Hone |
| D640,272 S | 6/2011 | Arnold |
| D640,274 S | 6/2011 | Arnold |
| D643,851 S | 8/2011 | Arnold |
| D644,240 S | 8/2011 | Arnold |
| D646,691 S | 10/2011 | Thai |
| D648,735 S | 11/2011 | Arnold |
| D656,514 S | 3/2012 | Thai |
| D658,674 S | 5/2012 | Shallcross |
| D664,970 S | 8/2012 | Ray |
| D671,135 S | 11/2012 | Arnold |

(Continued)

OTHER PUBLICATIONS

USPTO, Non-final Office Action for U.S. Appl. No. 29/522,103, dated Apr. 8, 2016, 8 pages.

(Continued)

*Primary Examiner* — David E Choi
(74) *Attorney, Agent, or Firm* — Lisa Benado; IP Spring

(57) ABSTRACT

Implementations generally relate to navigating event information. In some implementations, a method includes accessing stored first information related to a plurality of events and providing for display in chronological order, first level cards that are associated with a first time period and that represent the stored first information for events with a first level event significance dynamically determined based on importance factors. The method further includes receiving a request to increase specificity of a particular first level and providing, for display in chronological order, second level cards that are associated with a second time period that is a shorter segment of the first time period, and that represent stored second information for events with a second level significance dynamically determined based on the one or more importance factors, in which the stored second information is a subset of the stored first information.

24 Claims, 14 Drawing Sheets

(56) References Cited

U.S. PATENT DOCUMENTS

| | | |
|---|---|---|
| D673,168 S | 12/2012 | Frijlink |
| D673,172 S | 12/2012 | Peters |
| D682,853 S | 5/2013 | Walsh |
| D682,875 S | 5/2013 | Frijlink |
| D685,389 S | 7/2013 | Gardner |
| D686,221 S | 7/2013 | Brinda et al. |
| D689,890 S | 9/2013 | Fong |
| D692,448 S | 10/2013 | Jung |
| D692,456 S | 10/2013 | Brinda |
| D695,778 S | 12/2013 | Edwards |
| D699,743 S | 2/2014 | Arnold |
| D699,744 S | 2/2014 | Ho Kushner |
| D706,803 S | 6/2014 | Rogowski et al. |
| D708,200 S | 7/2014 | Yu |
| D717,817 S | 11/2014 | Yu |
| 8,949,250 B1 | 2/2015 | Garg et al. |
| D726,203 S | 4/2015 | Prajapati |
| D729,271 S | 5/2015 | Zhang et al. |
| D731,509 S | 6/2015 | Sueishi et al. |
| D743,999 S | 11/2015 | Villamor |
| D746,304 S | 12/2015 | Gray |
| D749,625 S | 2/2016 | Yang |
| D750,644 S | 3/2016 | Bhutani |
| D753,703 S | 4/2016 | Villamor et al. |
| D753,705 S | 4/2016 | Sanderson |
| D753,709 S | 4/2016 | Kaawnabe |
| D754,169 S | 4/2016 | Kaplan |
| D754,688 S | 4/2016 | Chaudhri et al. |
| D754,718 S | 4/2016 | Zhou |
| D754,719 S | 4/2016 | Zha |
| D755,224 S | 5/2016 | Abbas |
| D755,805 S | 5/2016 | Zankowski et al. |
| D755,832 S | 5/2016 | Liu et al. |
| D759,673 S | 6/2016 | Looney et al. |
| D760,734 S | 7/2016 | Patel et al. |
| D762,685 S | 8/2016 | Eom et al. |
| 9,747,141 B2* | 8/2017 | Caunter ............... G06F 9/454 |
| 2008/0079693 A1* | 4/2008 | Okamoto ............... G06F 3/01 |
| | | 345/157 |
| 2009/0249359 A1* | 10/2009 | Caunter ............... G06F 9/454 |
| | | 719/315 |
| 2010/0283743 A1* | 11/2010 | Coddington .......... G06F 3/0485 |
| | | 345/173 |
| 2011/0055741 A1* | 3/2011 | Jeon ............... G06F 3/04817 |
| | | 715/765 |
| 2011/0167382 A1* | 7/2011 | van Os ............... G06Q 10/109 |
| | | 715/800 |
| 2013/0191388 A1 | 7/2013 | Bernhardt et al. |
| 2013/0212491 A1* | 8/2013 | Yerli ............... H04L 51/32 |
| | | 715/753 |
| 2013/0283194 A1 | 10/2013 | Kopp et al. |
| 2014/0006388 A1 | 1/2014 | Yeskel et al. |
| 2015/0006545 A1 | 1/2015 | Das et al. |
| 2015/0154774 A1* | 6/2015 | Kolhi ............... H04N 21/4316 |
| | | 345/629 |
| 2016/0283076 A1* | 9/2016 | Armstrong ............ G06F 3/0485 |

OTHER PUBLICATIONS

USPTO, Non-final Office Action for U.S. Appl. No. 29/522,089, dated Apr. 11, 2016, 7 pages.
USPTO, Notice of Allowance for U.S. Appl. No. 29/522,089, dated Sep. 1, 2016, 10 pages.
USPTO, Notice of Allowance for U.S. Appl. No. 29/522,103, dated Sep. 1, 2016, 10 pages.
"International Search Report and Written Opinion", International Application No. PCT/US2016/024387, dated Jun. 23, 2016, 15 pages.
Jason R. Rich, et al., "View, Organize, Edit, and Share Pictures Using the Photos App on your iPhone or iPad", URL:http://www.quepublishing.com/articles/article.aspx?p=2186776, Apr. 11, 2014.
International Preliminary Report on Patentability in International Application No. PCT/US2016/024387, 10 pages, dated Oct. 12, 2017.
Communication pursuant to Article 94(3) EPC in European Application No. 16720213.4, 4 pages, dated Aug. 3, 2018.

* cited by examiner

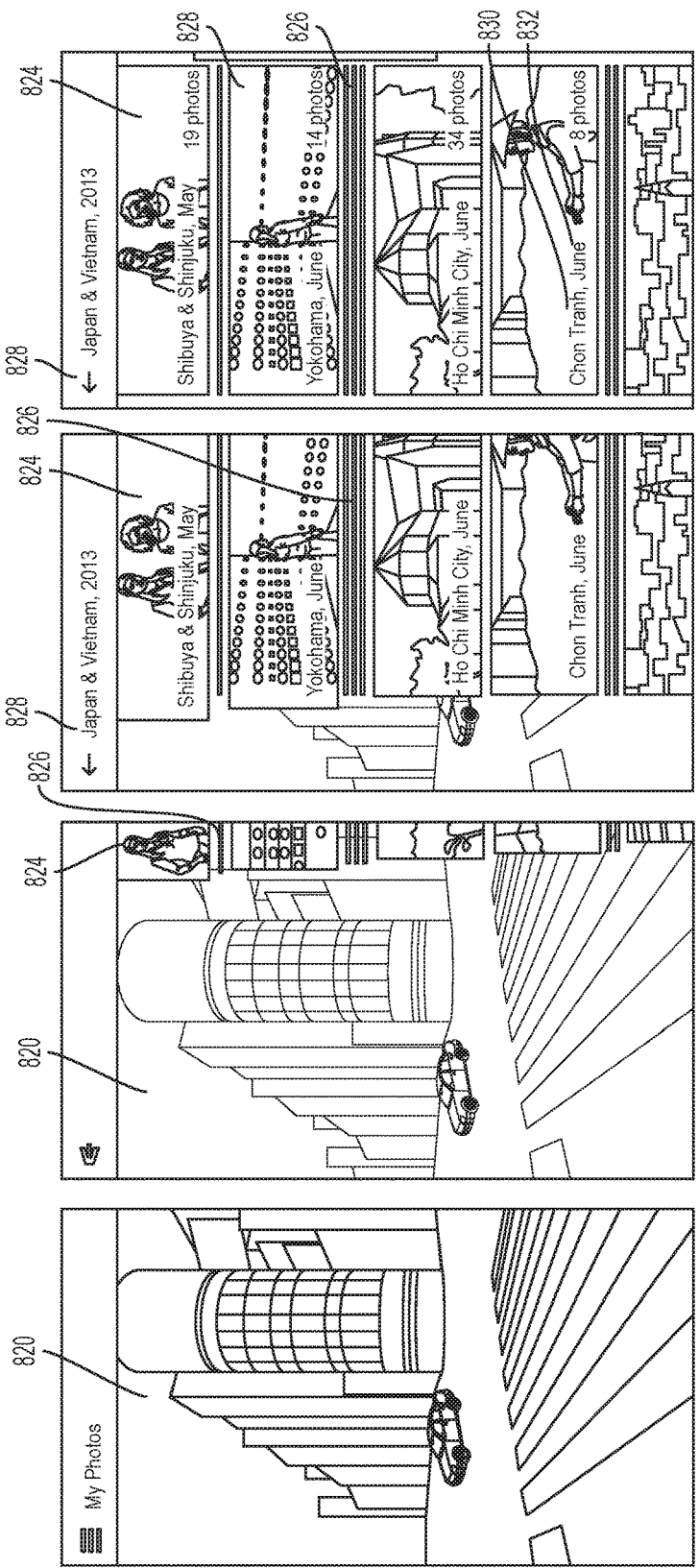

NAVIGATING EVENT INFORMATION

CROSS REFERENCE TO RELATED APPLICATIONS

This application claims priority to Provisional application Ser. No. 29/522,103 entitled "Navigating Event Information," filed Mar. 27, 2015, which is hereby incorporated by reference as if set forth in full in this application for all purposes.

BACKGROUND

Wide availability of capture devices and advances in high capacity storage have led to a potential of recording immense volumes of information. Some information may be generated during the occurrence of events. Information may take the form of photographs, videos, posts, media, text, chat, and other types of media content. From time to time, people may wish to view the information generated during events.

SUMMARY

Implementations generally relate to navigating a plurality of event information to locate target information. The event information may be displayed in chronological order and in broad time period levels and navigated to be displayed in narrowing levels. In some implementations, the event information may be displayed in chronological order from narrow time period levels to broader levels.

In some implementations, a method may employ a computing device to access first information related to a plurality of events. The method further may use the computing device to provide, for display in chronological order, one or more first level cards that represent the first information for events with a first level significance. The first level event significance may be dynamically determined based on one or more importance factors. The one or more first level cards may also be associated with a first time period. The computing device may also receive a request to increase specificity of a particular first level card. The method may additionally include applying the computing device to provide, for display in chronological order, one or more second level cards that represent second information for events with a second level significance dynamically determined based on the one or more importance factors. The one or more second level cards may be associated with a second time period that is a segment of the first time period and is shorter in duration than the first time period. The second information may also be a subset of the first information.

In some aspects, the method may include receiving instructions from the user to display the second information from at least one of the one or more of the second level cards and providing through a computing device, for display, the second information from the at least one of the one or more of the second level cards. In some implementations, the method may further include providing by a computing device, for display in the chronological order of one or more first level cards, a collapsed element that represents the first information for events with less significance than the first level event significance, dynamically determined based on one or more importance factors. The collapsed element may be associated with the first time period. The method may also receive a request from a user to increase specificity of the collapsed element and to replace the collapsed element with a first level card.

In some implementations, the chronological order of the one or more first level cards is scrollable to display additional first level cards. In further implementations, an animation may be included during a transition period to display the chronological order of the one or more second level cards in which one or more first level cards are progressively replaced by the one or more second level cards.

In some implementations, a method may employ a user computing device to request and navigate first information related to a plurality of events. The user computing device may display, in chronological order, one or more first level cards that represent the information for events with a first level significance dynamically determined based on one or more importance factors. The one or more first level cards may be associated with a first period of time. The method further may enlist the user computing device to request an increase in specificity of a particular first level card. As a result of the request, the user computing device may display, in chronological order, one or more second level cards that represent second information for events with a second level significance dynamically determined based on one or more importance factors. The one or more second level cards may be associated with a second period of time that is a segment of the first time period and is shorter in duration than the first time period. Further, the second information may be a subset of the first information. In various implementations, a transition period may be included in which portions of the one or more second level cards progressively replace portions of the one or more first level cards.

In some aspects of the method employing the user computing device, during the transition period, replacing of the first level cards is by an animation of sliding second level cards. In some implementations, the animation further includes enlarging the particular first level card prior to sliding of the second level cards. Further, in some implementations, the sliding of the second level cards is staggered to progressively replace the first level cards The chronological order of one or more first level cards may be scrollable to display additional first level cards.

In some aspects of the method with the user computing device, a user computing device may request the display of second event information from at least one select of the one or more second level cards. In response to the request, the second information may be displayed from the selected second level cards.

In some implementations of the method with the user computing device, a collapsed element associated with a first time period and that represents the first information for events with less significance than the first level significance may further be displayed by the user computing device. The collapsed element may be presented in the chronological order of the one or more first level cards. The less significance determination may be dynamically made based on one or more importance factors. In still some implementations, the user computing device may request to increase specificity of the collapsed element and in response, the collapsed element may be replaced with a first level card.

In still other implementations, a tangible, non-transient recordable, computer-readable storage device, such as medium, is discussed to store instructions that cause performance of operations. The non-transitory computer-readable medium may store instructions that, access, by a computing device, first information related to a plurality of events. The instructions further may provide, by the computing device, for display in chronological order, one or more first level cards that represent the first information for events with first level event significance dynamically determined based on one or more importance factors. The one or more first level cards may be associated with a first time period. Further, the instructions may include receiving, by the computing device, a request to increase specificity of a particular first level card. In addition, the instructions may include providing, by the computing device, for display in chronological order, one or more second level cards that represent second information for events with a second level significance dynamically determined based on the one or more importance factors. The one or more second level cards may be associated with a second time period that is a segment of the first time period and is shorter in duration than the first time period. The second information may be a subset of the first information. In some implementations, the chronological order of the one or more first level cards may be scrollable to display additional first level cards.

In further implementations, an animation may be included during a transition period to display the chronological order of second level cards in which one or more first level cards are progressively replaced by the one or more second level cards. In still some implementations, actions performed by the computer readable medium further may include receiving instructions to display the second information from at least one select of the one or more second level cards. In response, the instructions may provide, by the computing device, for display, the second information from the at least one select of the one or more second level cards.

In some implementations, the computer-readable medium may further include providing with the computing device, for display in the chronological order of the one or more first level cards, a collapsed element that represents the first information for events with less significance than the first level event significance. The event significance may be dynamically determined based on one or more importance factors. The collapsed element may be associated with the first time period. The collapsed element may be replaced with a first level card should the instructions include receiving a request to increase specificity of the collapsed element.

In yet some implementations, a navigation system is provided and may include one or more processors and a memory coupled to the processors. The memory may be configured to store instructions, such as an application, that cause the one or more processors to access first information related to a plurality of events; provide for display in chronological order, one or more first level cards that are associated with a first time period and that represent the first information for events with a first level event significance dynamically determined based on one or more importance factors; receive a request to increase specificity of a particular first level card; and provide for display in chronological order, one or more second level cards that represent second information for events with a second level significance dynamically determined based on the one or more importance factors. The one or more second level cards may be associated with a second time period that is a segment of the first time period and is shorter in duration than the first time period. Also, the second information may be a subset of the first information. The chronological order of the one or more first level cards may be scrollable to display additional first level cards. Further, an animation may be included during a transition period to display the chronological order of the one or more second level cards in which one or more of the one or more first level cards are progressively replaced by the one or more second level cards.

In some implementations, the instructions may further the one or more processors to cause receive a request to display the second information from at least one select one or more of the second level cards and may cause second information to be provided for display. The instructions may additionally cause the one or more processors to provide for display in the chronological order of one or more first level cards, a collapsed element that represents the first information for events with less significance than the first level event significance, dynamically determined based on one or more importance factors. The collapsed element may be associated with the first time period. In some implementations, the instructions may additionally cause the one or more processors to receive a request from a user to increase specificity of the collapsed element and to replace the collapsed element with a first level card.

In still other implementations a computer implemented method includes requesting, by a user computing device, stored first photographs related to a plurality of events; displaying, by the user computing device, in chronological order, one or more first level cards that represent the stored first photographs for events with a first level significance dynamically determined based on one or more importance factors, in which the one or more first level cards are associated with a first time period; requesting, by the user computing device, an increase in specificity of a particular first level card; and displaying through a transition period, by the user computing device, in chronological order, one or more second level cards that represent stored second photographs for events with a second level significance dynamically determined based on one or more importance factors. The one or more second level cards may be associated with a second time period that is a segment of the first time period and is shorter in duration than the first time period. In addition, the stored second photographs may be a subset of the stored first photographs. During the transition period, portions of the one or more second level cards may progressively replace portions of the one or more first level cards. In some implementations, the importance factors may be based on metadata of the photographs. Further, in some implementations, the importance factors may be based on visual content of the photographs.

In some implementations an apparatus may be provided and include means for accessing first information related to a plurality of events. For example, first information may be stored in a database that is accessed by the apparatus. The apparatus may further include a means for displaying in chronological order, one or more first level cards that represent the first information for events having a first level significance and associated with a first time period. The apparatus may include a means for dynamically determining the first level event significance based on one or more importance factors. The apparatus may also include a mean for receive a request to increase specificity of a particular first level card. Such means for accessing may include, for example, an interface of the apparatus. The apparatus may also include a mean for displaying in chronological order, one or more second level cards that represent second information for events having a second level significance and a means for dynamically determining the second level significance of the events based on the one or more importance factors. Such second level cards may be associated with a second time period that is a segment of the first time period and is shorter in duration than the first time period. The second information may also be a subset of the first information.

DETAILED DESCRIPTION

Figure 1:
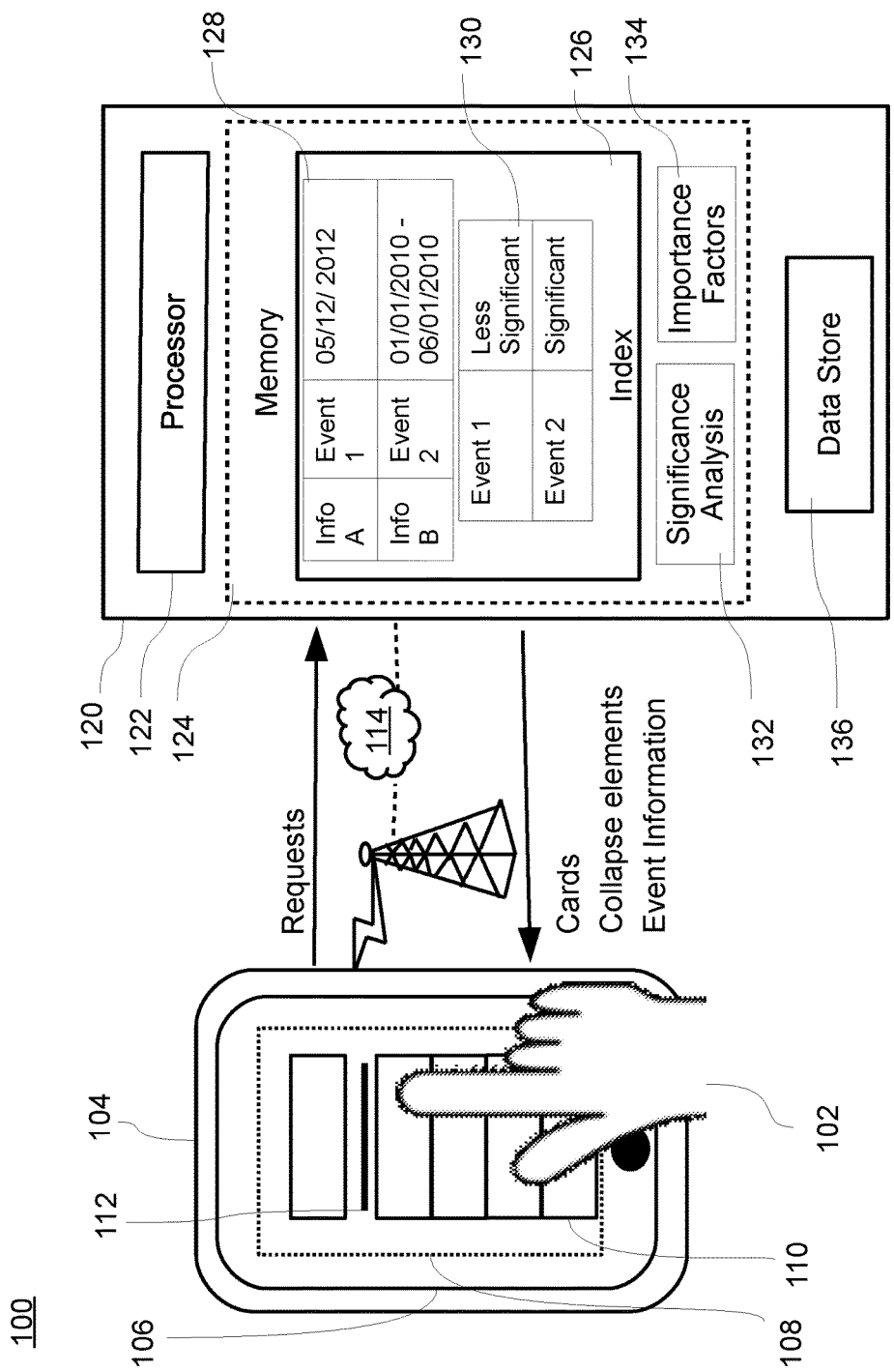
FIG. 1 is a conceptual diagram illustrating an example environment in which various aspects of an event search interface can be implemented in an navigation system.

In various implementations, a navigation system provides a tool for browsing information related to events. An event may be an occurrence during a particular time interval and place. The navigation system enables locating target event information of interest. In various implementations, the navigation system determines and sorts events that the system determines as meaningful and those considered less important or unimportant. The system may group various types of information related to events into levels of significance of the events. For example, the event information may include various types of content, such as images, emails, photographs, videos, electronic drawings or paintings, animations, music or other forms of audio and interactive content, including multimedia shared on social media websites. The event information may also be text, such as social media documents, posts, tweets, blogs, and social news. In some implementations, the event information may be news and descriptions of historical events, data (such as scientific data including chemical reaction test data; seismic monitoring of earthquakes and other seismic disturbances), and combinations of any of the foregoing. The information may be generated by one user or one or more groups of users and may be accessed by the user(s) who generated the content or by others. The information may be personal to a user, or may be widely distributed non-personal information.

There are some events portrayed by the information that are instantly meaningful, such as a wedding, graduation, a major sporting event, a presidential inauguration, etc. The importance of some events may change over the course of time. For example, there may be events that become more noteworthy and valuable over time, while others events may be thought of as being less meaningful. At times, information related to significant events may be mixed with information associated with less significant events. As a body of information grows with an increase in the number of events that occurs, browsing or searching for target information related to a particular event may be cumbersome without the use of the navigation system.

Implementations of the navigation system may assist a user who desires to browse or search for event information and who can benefit from a system that presents the information in a manageable, easy to navigate manner. Accounting for a myriad of event information may be complicated. Navigating the endless timeline of event information, without an intuitive user interface, may also be time consuming. For example, a student user may gather much event information while attending college. At one point during the time period that the student user is in college, the student user may participate in a professional event. The student user may create and store information about the event as well as a plethora of other information portraying college experiences, such as taking photographs during the event, making video clips, posting on social media sites, such as tweeting, creating digital diary entries, making calendar entries, jotting down digital notes, etc.

In the foregoing example, the student user may want to retrieve the information at a later time for networking purposes after the student graduates. It would be advantageous if the user could quickly and easily sort through the large amount of information to locate the target information. Sorting by a query based on event location alone may not be particularly helpful if the event took place at a location the student user frequents, such as a campus auditorium. However, initiating a search for the information within select periods of time, such as sorting by years during which the student user attended college, or sorting by a particular year of college or college semester, may expedite the search.

In some implementations, the navigation system provides an intuitive interface that enables a user to quickly dive through levels of displayed events in increasing granularity to more specific periods of time and to find target information.

Some events may have a specific temporal context and the date of the event may be readily remembered, such as the 9/11 disaster. Other event dates may be either altogether forgotten. Still other events may only be generally remembered as having occurred at some point in a broad time interval, for example occurring sometime during a range of years, a particular year, or a month of occurrence.

Challenges may arise should a user desire to locate information about an event that is considered less significant at one time period and then the event status changes to be considered more significant later. In an example scenario, the student user may be introduced to a company or a person who, after graduation from school, becomes more important to the student user, such as through job prospects or work colleagues. A benefit to the navigation system is providing a dynamically adjusting functionality to update levels of significance of events, where certain events may be considered more or less significant to the user, to a particular group or to a general population, at any given point in time.

In situations in which the systems and methods discussed herein may collect or utilize personal information about users, the users are provided with one or more opportunities to control whether information is collected, stored, and/or used, as well as control how the information is collected, stored and/or used. Personal information may include, for example, user data, information about a user's social network, user's location, user's biometric information, user's activities and demographic information, Accordingly, the systems and methods discussed herein collect, store and/or user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user to provide permission or authorization as to whether the information is collected and as to which portions of the information are to be collected. For example, users can be provided with one or more such control options over a communication network. In addition, certain data may be treated in one or more ways before it is stored or used to remove personally identifiable information. For instance, a user's identity may be treated so that no personally identifiable information can be determined. As another example, a user's geographic location may be generalized to a larger region so that the user's particular location cannot be determined.

FIG. 1 illustrates an example environment in which to implement some embodiments of a navigation system 100. In some implementations, the system 100 may include a search device 104 for conducting search queries and a computing device 120 for analyzing and processing event information. The search device 104 and computing device 120 may communicate with each other across a network 114 to implement a date based search for event information. The system 100 makes it easy for a user 102 to sift through event information to find particular information through a search interface 106, such as a graphical user interface. In some implementations, the search device 104 and computing device 120 may be integrated into one device. In some implementations, the functionalities of the search device 104 and computing device 120 may be performed by a combination of separate devices.

In the example shown by FIG. 1, a user 102 initiates a search for event information. The search device 104 displays the search interface 106 on a display screen 108. A smartphone type search device 104 is shown. Any other types of suitable search devices are applicable for use with the current system, e.g., personal digital assistant, tablet, mobile internet device a digital still camera, digital video camera, personal navigation device, a wrist watch and other wearable computers, head mounted display, other mobile devices, etc. The search device 104 in accordance with various embodiments may be any computing device capable of receiving query input and presenting search results, as well as determining and processing input, with or without information capture elements. For example, the navigation system is useful with notebook computers, a laptop computer, a netbook, desktop computers, game console, among devices capable of inputting search queries and imparting results.

In some implementations, the navigation system may be operated as a mobile application on a mobile computing device (e.g., smartphone). Other implementations include the navigation system running on a web browser with any type of computing device, for example, functioning as a standalone computer program, etc. One example may be a client/server architecture where data is requested to be provided from a server and displayed on a client device. In another example, all data storage and computations may be performed on one device.

Display screen 106 on the search device 104 may be used to display the search interface 106, which may include digital cards 110 representing significant event information, collapsed elements 112 representing less significant event information, event information, various input elements, navigation elements, query input fields, drop down menus, etc. The display screen 106 may be a TFT (thin-film transistor) liquid crystal display, an OLED (organic light emitting diode) display, head mounted display, or other suitable display technology. In some implementations, the display screen 106 is on a mobile device having multi-touch sensitive screens. A given user may use commands such as zoom in, tap, scrolling, swiping, etc., for rapid viewing of events. In some implementations, search devices accept various other inputs, such as voice commands and keyboard strokes. It may be appreciated that search devices with other types of screens may also be utilized to exploit the date-based organizational levels for event information of the navigation system 100.

The user may interact with the search device 104 through an input. Various inputs include, without limitation, touchscreen, switch input with an on-screen or external keyboard, head mouse, voice recognition, gesture recognition, facial recognition, movement tracker, eye movement tracker, smart buttons, trackball, track pen, pen tablet, pen, stylus, and hand mouse. The input may include a user applying touch, voice, click, tap, type, gestures, movement (e.g., moving an eye, arm, body), and other actions. In some implementations, a user contacts the display screen 106 using a finger or stylus in order to select items displayed by the display screen 106. The user may enter text or activate control functions of the search device 104.

The search interface displayed on display screen 106 may receive commands from a given user, convert them for use by a processor in the search device 104, and transmit them to, for example, the computing device 120 through an external interface. In some implementations, the search device 104 may transmit across network 114 to computing device 120, a request to retrieve event information. The request may be provided from a user's instructions. In some implementations, the user request may initiate the computing device 120 to provide display elements representing processed event information for the search interface.

During a processing phase, the processor 122 of the computing device 120 may analyze the event information to cluster the information into discrete events. For example, various metadata in event information may assist in event information clustering. Various techniques may be employed to identify and cluster the information. For example, the information may include metadata with similar or the same labels or tags, e.g., geotags and timestamps, that indicate a group of information belongs to a particular event (e.g., geotags indicate Paris and timestamps indicate Christmas day). Metadata in the form of tags may be user generated or automatically generated by the system (e.g., based on device information, GPS, server information, etc.). Metadata for event information may also include likes, comments, views, repeat views, comments on comments, forwards, emails, etc. For event information that include images, various combinations of object recognition processes may be utilized to identify objects represented in the images to assist in identifying events portrayed by the images (e.g., a birthday cake is used to identify a birthday celebration), with the user providing consent for such object recognition of images.

In some implementations, in order to recognize an object in images, the system 100 may compare the object (e.g., image of the object) and match the object to reference images of the object. In some implementations, system 100 may search reference images in order to identify any one or more reference images that are similar to the object in the image. In some implementations, for a given reference image, system 100 may extract features from the image of the object in an image for analysis, and then compare those features to those of one or more reference images. For example, system 100 may analyze the relative position, size, and/or shape of object features such as facial characteristics, body characteristics, etc. In some implementations, system 100 may use data gathered from the analysis to match the object in the image to one more reference images with matching or similar features. In some implementations, system 100 may normalize multiple reference images, and compress object data from those images into a composite representation having information (e.g., object feature data), and then compare the object in the image to the composite representation for facial recognition, with user's consent to make use of object features, such as facial characteristics, body characteristics, etc.

In some scenarios, the object in the image may be similar to multiple reference images associated with the objects in the same category. As such, that navigation system would determine that a high probability exists that the object associated with the object in the image is the same object associated with the reference images.

In some implementations, to facilitate in object recognition, system 100 may use geometric recognition algorithms, which are based on feature discrimination. System 100 may also use photometric algorithms, which are based on a statistical approach that distills an object feature into values for comparison. A combination of the geometric and photometric approaches could also be used when comparing the object in the image to one or more references.

Other recognition algorithms may be used. For example, system 100 may use recognition algorithms that use one or more of principal component analyses, linear discriminant analysis, elastic bunch graph matching, hidden Markov models, and dynamic link matching. It will be appreciated that system 100 may use other known or later developed recognition algorithms, techniques, and/or systems.

In some implementations, facial recognition is employed with user consent and the system 100 enables users of the social network system to specify and/or consent to the use of personal information, which may include system 100 using their faces in images or using their identity information in recognizing people identified in images. For example, system 100 provides users with multiple selections directed to specifying and/or consenting to the use of personal information. For example, selections with regard to specifying and/or consenting are associated with individual images, all images, individual photo albums, all photo albums, etc. The selections may be implemented in a variety of ways. For example, system 100 causes buttons or check boxes to be displayed next to various selections. In some implementations, system 100 enables users of the social network to specify and/or consent to the use of using their images for facial recognition in general.

The event information may be clustered by event identifiers attached to the information, such as a tag. In some implementations, the computing device may include an index 126, for example in the form of a look-up table, to store information identifiers, the corresponding event identifiers and date of the event in information table 128. The information table 128 may be stored in memory 124 and the event information may be stored in a remote storage unit or the event information may be kept locally in the data store 136 in the computing device 120. In some cases, information may be clustered into more than one event, such that the information is associated with more than one event identifier. In some implementations, the event information for the events may be collectively stored together in a data store 136.

In some implementations, event information may have been previously analyzed and processed for presentation to the search device when the event information was captured and/or downloaded. In some implementations, the analysis and processing of event information may initially occur upon the initiation of a search request from the search device, and/or the analysis and processing may dynamically update, for example, significance of an event, upon generation or receipt of a search request. The analysis and processing of event information may also be performed prior to a search request and dynamically updated, such as updating significance of an event, after the search request is generated or received. Furthermore, in some implementations, analysis and processing of the event information may be performed directly on the search device 104, in which case components of the computing device 120 for event information analysis and processing are provided in the search device 104.

In some implementations, the date of the event may be the range from the onset of the event to end of the event. In some implementations, the event date may be either the beginning, middle or the end of the date. In still some implementations, the event date may be date in which the most significant aspect of the event had occurred.

Further to the processing, the events may be analyzed to determine the significance of the various events with significance analysis module 132 and their significance value may be stored in a significance table 120 in index 126 in memory 124. Events that are deemed significant may be provided to the search device as cards.

In some implementations, only events that qualify by having a threshold significance value surface as a card on the search interface 108. One or more of importance factors or rules stored in importance factors module 134 may be used in determining a significance value. In some implementations, the importance factors are based on content of the event information, such as visual content of photographs. Importance factors may also be based on metadata of the event information. In still some implementations the factors may utilize characteristics of the events in the determination. Some such factors may include location of the event and the distance of the location from a home point, the date, time and time span of the event, the identification of popular landmarks, encompassing a set data value, people present at the event, number of photos of the event that are available, etc.

In some implementations, some importance factors may require an update of the significance determination for events. Some such factors that may change the significance determination over time may include, ranking of social contacts captured by the event information, frequency of visits, social popularity of the event location, location proximity to known contacts, user's, contacts or general population of social media posts or tweets, relative importance of the event to other events, social trending of the event, user indication of importance, metadata associated with the event information, etc. In some implementations, the importance factors may be changed to add, remove or alter one or more factors from the algorithm. For example, a particular importance may indicate significance during a certain time, after which the factor may be automatically be removed as a factor. In some implementations, the user may add or remove importance factors.

In some implementations, the addition, removal or alteration of an importance factor, may trigger the navigation system to dynamically perform an update to significance statuses for stored events. In response to the update, event cards and collapsed elements may be changed to reflect any change in significance of the underlying represented event(s). For example, collapsed elements may change to event cards for one or more events with changed significance from less significant to meeting a threshold value of significance. Further, event cards may change to collapsed elements for any represented events having a change in significance to lower than a threshold value of significance.

Significance of an event may be personal to a user or may be universal with different users. In some situations, more than one user may access and search the same event information, in which case, a significance value may be determined for each user or for groups of users. Thus, an event may have one or more than one significance based on the user, in which case the user and associated significance value may be stored in the significance table 120.

In situations in which the system discussed here collects personal information about users, or may make use of personal information, the users may be provided with an opportunity to control whether programs or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The navigation system provides a benefit in dynamically determining significance of events. For example, the system may update significance of events by use of the importance factors on a regularly prescheduled update time. At times, updates to event significance may occur upon a triggering occurrence. For example, the system may update significance values upon receipt of new event information. In some implementations, an update occurs upon user request, such as the initiation of an event search query.

Figure 2:
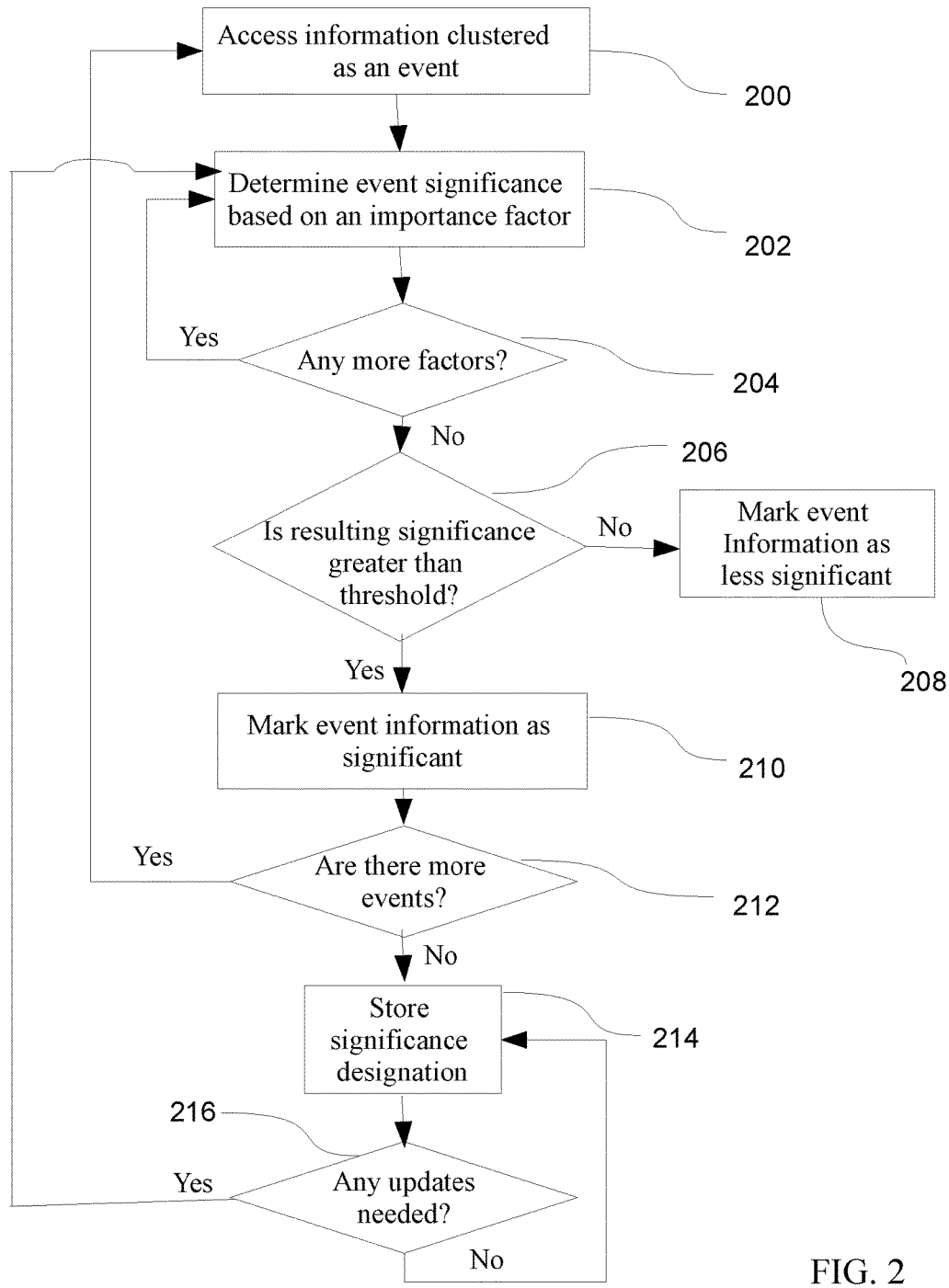
FIG. 2 is a flow diagram of an example of determining significance of event information.

FIG. 2 illustrates an example of processes for determining significance of an event that may be used in accordance with various implementations. In the various implementations described herein, the processor of system 100 performs the steps described through significance analysis module 132.

In block 200 of the process, it is checked whether user consent (e.g., user permission) has been obtained to make use of user data in the implementation of the process for determining significance of an event. In some implementations, importance factors are based on user preferences, information about a user's social network and contacts, user characteristics (e.g., identity, name, age, gender, profession, etc.), social and other types of actions and activities, content, ratings and opinions created or submitted by a user, a user's current location, historical user data etc. One or more blocks of the process described herein use such user data in some implementations. If user consent has been obtained from the relevant users for which user data may be used in the process, then in block 202, it is determined that the blocks of the method herein can be implemented with possible use of user data, and the method continues to block 206 If user consent has not been obtained, it is determined in block 204 that blocks are to be implemented without use of user data, and the method continues to block 206. For example, in some implementations, importance factors are not based on particular user data for which consent has not been received. In some implementations, if user consent has not been obtained, the remainder of the process is not performed.

In block 206 of the process, event information is accessed, such as the computing device 120 receiving downloaded information or communicating with a server that stores the event information. The event information is clustered under an event that is represented by the event information. The event information may be acquired from the search device 104, an internal or external storage medium, a social networking site, additional users, and other sources. In some implementations, the receipt of incoming event information may coincide with launching of the significance determining process.

In block 208, the processor 122 of the computing device 120 may determine the significance value of an event based on an importance factor, as described above. Decision block 210 determines if there are additional importance factors to consider for the event. If the significance determining process concludes that there are additional importance factors, the process proceeds back to step 208 to determine the significance value for the next importance factor.

Once there are no more importance factors to be considered, in block 212, the processor 122 of the computing device 120 may determine an overall resulting significance for the event and determine the event to be significant if the result is greater than a threshold amount. For example, an average significance value may be determined from the significance factors considered. In some implementations, certain importance factors may have higher consideration than others. Thus, the determination of significance may include a weighting of some factors greater than other factors. The weighting of factors may be automatically employed, or may be requested by the user. In block 214, the event information clustered under the event may be marked or otherwise characterized as significant as they relate to the event found to be significant.

The threshold value required to be identified as a significant event may be a preset value or a user may input the threshold value to be applied to events. In some implementations, the threshold value may be static and in other implementations, the value may be dynamic. For example, the threshold value may change to a different value, in which case the significance of the events may be dynamically updated with consideration of the new threshold value.

In some implementations, the threshold value may be specific for the current event level being displayed, such that the value may be different for various levels of events. For example, the threshold of significance may be higher at higher event levels and the lower at decreasing event levels (lower levels). In this manner, events may be considered less significant when viewed in the context of higher levels (e.g., first level) that span longer time periods and more significant when viewed at lower levels (e.g., second level) extending over shorter time periods.

Where the threshold value of significance is not met by an event at any given time period, the event may be categorized as less significant, as shown in block 216. The event may be tagged as less significant and the significance table 130 in index 126 may also store the event as less significant, as shown in FIG. 1. Accordingly, event information clustered under an event may be marked as less significant as they relate to the event found to be less significant. Such a less significant label may change to a significant status should a threshold value be met at some later time. In addition, events tagged as significant may change to less significant, such as the case where a threshold value is no longer met.

The decision step of block 218 establishes whether there are additional events constituting event information. If the process concludes that there are additional events, the process proceeds back to step 206 to access event information of the next event. However, if it is determined that there are no additional events to categorize, the process maintains the significance categories in block 220. In some implementations, the significance designation may be updated at a later time, as shown in decision block 222. If an update is needed, the process returns back to step 208 to determine event significance based on the importance factor(s). During the update process, no change in status may be found, or less significant events, as represented by collapsed elements, may be changed to become significant events, as represented by cards, and vice versa. If no update is needed, the significance designation is maintained in storage.

To prepare for display of event information, the events are organized into levels with various periods of time. In an example implementation, the initial level for display of events spans a larger period of time and may encompass more event information than lower levels of events. Subsequent levels of events ("lower levels") are displayed with increase specificity of the events and cover narrower periods of time segments from the preceding higher levels of events ("high levels"). Thus, the lower level(s) may encompass a subset of event information of the high level(s).

Figure 3:
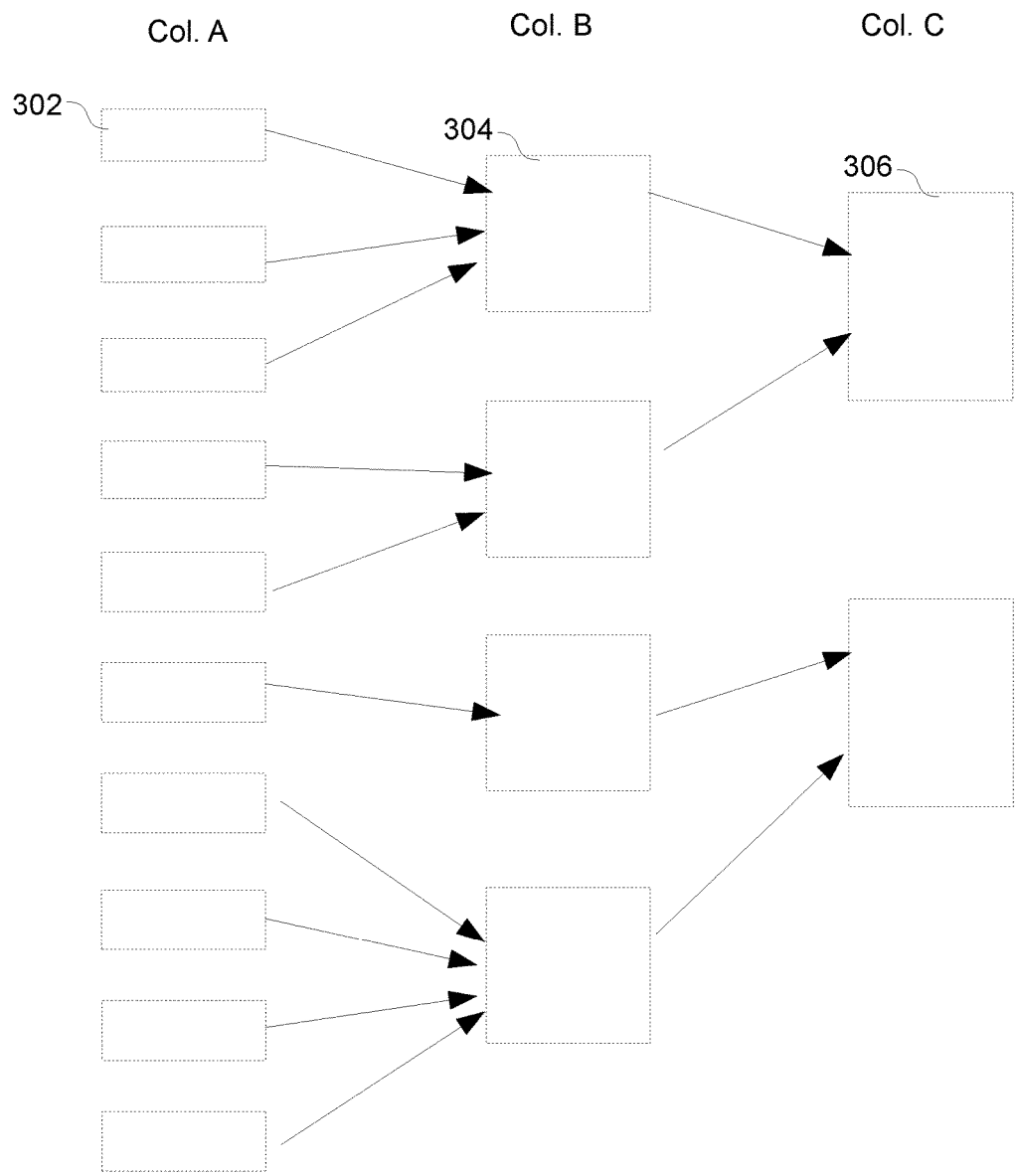
FIG. 3 is a block diagram of a hierarchical tree of event information by time period level.

Referring to FIG. 3, a block diagram illustrates clustering of events 302 into broader time period levels. Col. A includes ungrouped event information, in chronological order of occurrence of the event information. Col. B is an intermediate time period level of chronologically ordered events, in which one or more event information has been clustered into an associated event 304 for a particular time period level. The first grouping of event information in Col. B may be considered the lowest level of events 304. In the lowest level, each event of one or more event information may be represented by an associated event card, so that each lowest level card represents a single event. In Col. B, one or more events 304 may be further clustered into broader periods of time event clusters 306 that represent one or more events, and placed in chronological order into a higher level of event clusters 306, as shown in Col. C. On a display, each of the event clusters 306 may be represented by an associated card in chronological order within its level.

Figure 4:
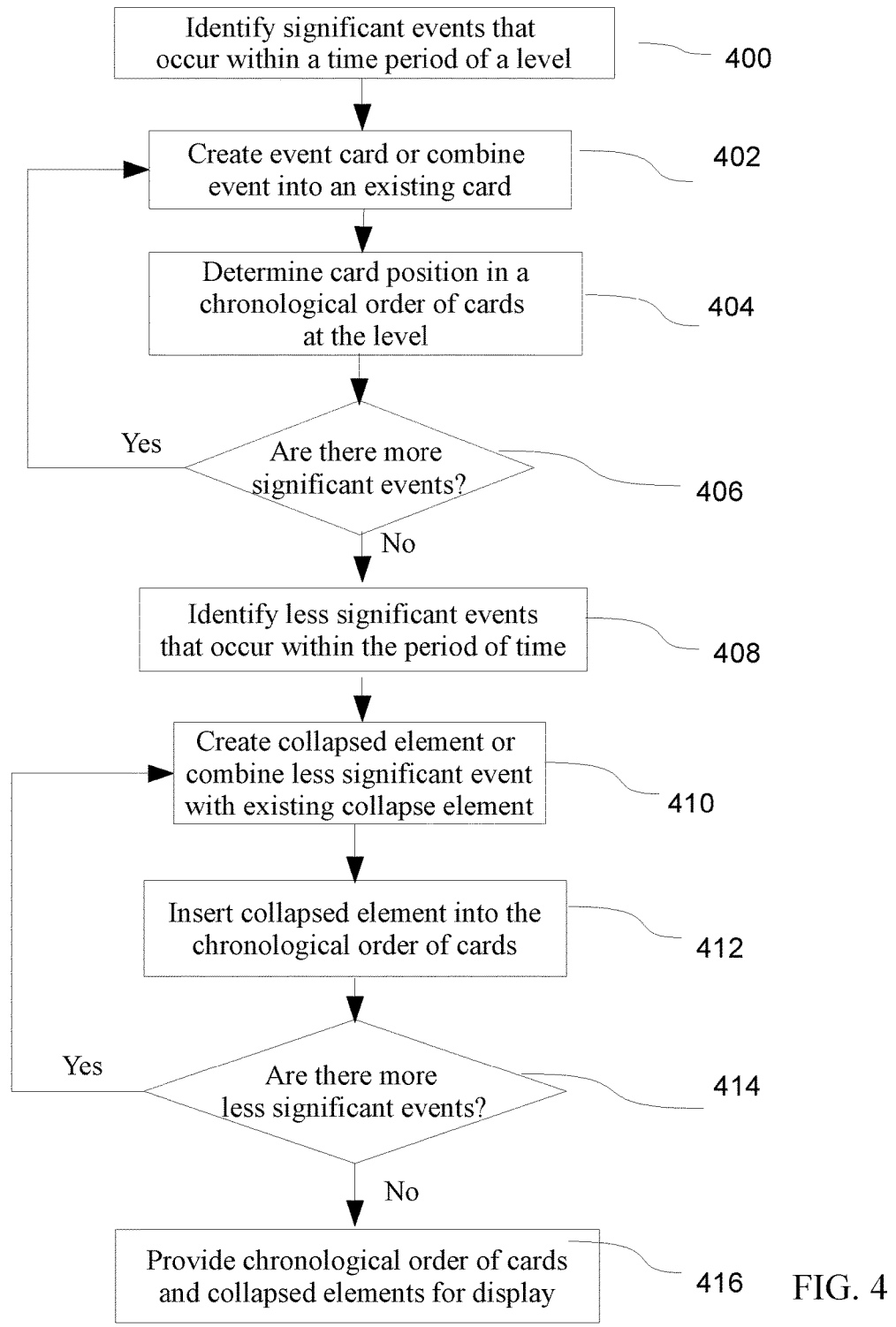
FIG. 4 is a flow diagram of example of preparing a search interface to navigate event information.

FIG. 4 illustrates an example of the processor 122 of the computing device 120 preparing display elements for the easy to navigate search interface 106 to display on the search device 104. In block 400, events are analyzed by the processor to determine the significant events that occur within a time period of a given level. In block 402, an event card may be created to represent the significant event, or the significant event may be combined with an existing card. In general, one or more significant events may be clustered and a card for the level may be created to represent the one or more of the significant events clustered for a corresponding time period level. A date may be associated with an event card corresponding to the date in which the clustered events occurred. The event card is inserted in position in chronological order with other event cards based on the event card date, as show in block 404. In cases that the present level card is the first to be processed, the event cards that follow are placed in chronological order for the given level with reference to the placement of the initial event card.

Decision block 406 determines if there are additional significant events that occur within the time period of the given level. If the process concludes that there are additional events, the process proceeds back to step 402 to create a card for the event and step 404 to position the level card in the chronological order. In some implementations, the additional significant event is combined with an existing card and a new card is not created for the event. When no further significant events are found, less significant events may be analyzed by the processor in block 408 to determine if there are less significant events that occur within the time period of the given level.

In block 410, a collapsed element is created for the less one or more of the less significant events for the given time period level, or the less significant event may be combined with an existing collapsed element. A date may be associated with each collapsed element corresponding to the date in which the event(s) represented by the collapsed element occurred. A position is determined for the collapsed element based on its date to insert along a chronological order of event cards for the given level, as shown in block 412. In some implementations, the date in which the less significant event is ordered may be the date in which the event started, middle of the event, or concluded.

Decision block 414 determines if there are additional less significant events that occur within the time period of the level. If process concludes that there are additional less significant events, the process proceeds back to step 410 to create a collapsed element for the event, or combine the event with an existing collapsed element, and to step 412 to position the collapsed element in the chronological order. In some implementations, more than one less significant event may be clustered together into a collapsed element. When no further significant events are found, the chronological order of cards and collapsed elements are provided, such as to the search device for display on the search interface, as shown in block 416.

Figure 5:
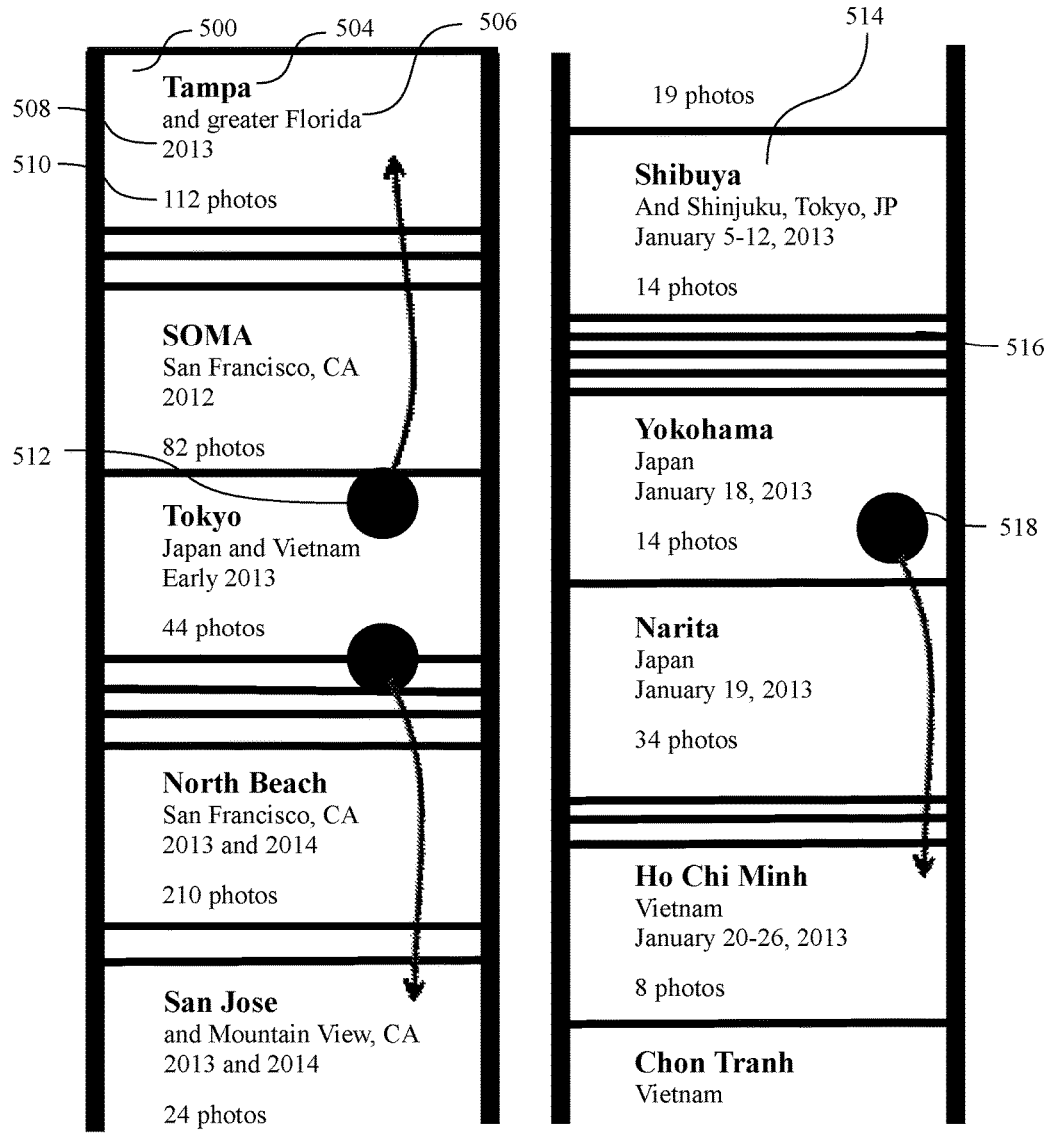
FIGS. 5 (a) and (b) are illustrations of example list of cards and collapsed elements.

FIGS. 5 (*a*) and (*b*) show examples of levels of event cards 500 and collapsed elements 502 in chronological order. An event card 500 may take the form of any of a variety of display elements that signifies one or more events captured by the information, such as a thumbnail. The card may present context material to indicate the event information it represents. The example cards shown in FIG. 5 (*a*) include a title 504 in large sized text, which may be based on an event location, descriptive event location 506, event date or date range 508 and quantity and type 510 of information represented by the card 504, such as numbers of photos and single viewpoint or multiple viewpoint (e.g., 360 degrees) images. For example, a card may include a picture, such as a representative image, icon, depiction, a still image from a video, etc. and/or informative text, such as a representative data, a title for the event, a date or date range for when the event took place, location, etc. In some implementations, additional descriptions may appear as a user hovers over or taps on the card, such as a video sample of the event information may be played.

Also shown are collapsed elements as horizontal lines inserted into the list of cards for each, or more than one, less significant event. In some implementations, collapsed elements may be in different forms inserted among the cards representing significant events. For example, the collapsed elements may be the same shape as the cards representing significant events and have smaller dimensions, such as smaller height, than cards representing significant events. Thus, in some implementations, the size of the cards may reflect the significance of the event such that smaller cards are for less significant events. In some implementations, collapsed elements may be cards with a lower resolution or color (e.g., black and white) than the cards representing significant events, or otherwise have qualities that signify less significance.

The higher level cards, as shown in FIG. 5 (a), represent a high level summary of events within a period of time. The timeline of cards and collapsed elements may be navigated to display further levels of detail in a manner comparable to navigating a digital map. For example, a search of a digital map may start at a global zoom level, where only continent labels may be initially displayed without fine details, e.g., city labels. By zooming in on an area of a digital map, more details of a location may be revealed. For the navigation system, a request to view a more detailed level of events for a card or collapsed element may be performed, for example, by tapping and spreading finger movements 512 on a touch screen to zoom in, as shown for illustration purposes as circles and arrows.

FIG. 5 (b) shows next lower level cards 514 and lower level collapsed elements 516, with each card representing a more detailed timescale and subset of event information of the corresponding higher level card. The list of cards may be scrolled to view additional cards with earlier or later dates in the chronological order of cards, as shown with a circle and arrow 518 for illustration purposes.

In some implementations, the higher level card may represent event information from a narrow time period. The next lower level cards may represent broader time periods. Such ordering of card levels from narrow to broader may assist, for example, a user who is aware of particular event information from a specific time and uses the known event information to browse other event information in a related time period.

Figure 6:
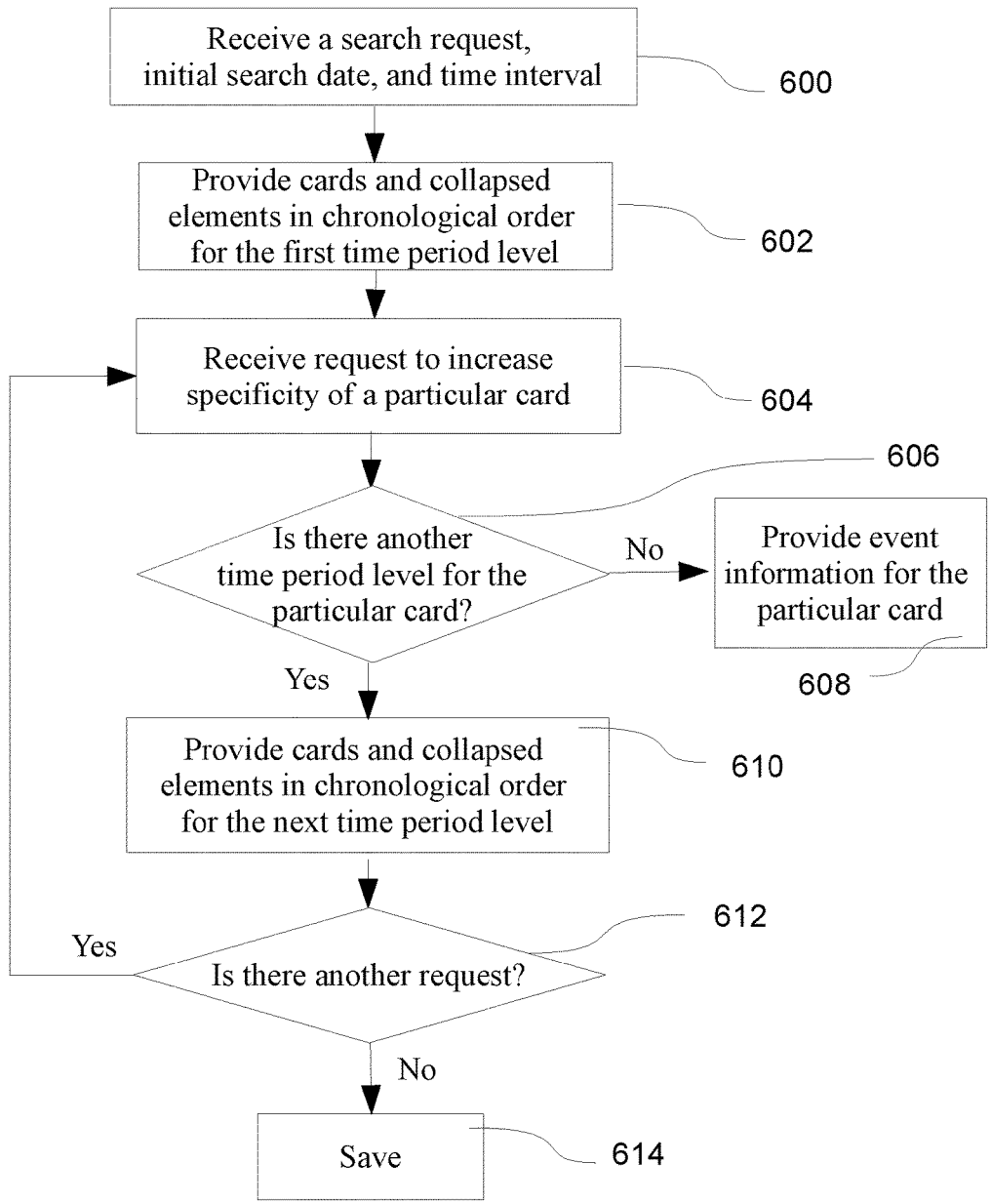
FIG. 6 is a flow diagram of example of providing a search interface to navigate event information.

FIG. 6 shows by way of a flow chart, some implementations of the navigation system which may be performed by the processor 122 of the computing device 120. In block 600, the computing device may receive a request for a search of event information.

The request may include an initial date or time period from which the user may want to begin its search. For example, the user may request the search to start within a broad time period, such as a particular year. The user may also select the time interval for event clusters, as represented by the date of first level cards. For example, a monthly time interval may be requested, in which case events may be clustered according months of the given year and first level cards dated by month may be presented in a first level of search. In another example, the user may request an initial date period of several years for the first level search and time interval for events may be yearly. In other implementations, an initial date period and/or time interval may be decided by a default setting.

In block 602, in response to the request, cards and collapsed elements are provided, such as by the computing device, for the first time period level. The cards and collapsed elements are in chronological order according to the time interval requested and within the initial date for the search. The cards and collapsed elements may be provided to the search device 104, such as through network 114, for display on the search device 104. In some implementations, the user may request the cards and collapsed elements to be provided to a different search device from the device that initiated the search request, such as another device operated by the user, search devices of social contacts, etc.

A user may select a particular one or more of the displayed cards to expand upon the events represented by the card. For example, the user may tap the card or a user interface element, or use a flick, pinch, spread, drag, or swipe gesture with one or multiple fingers on the card or other touch control gestures, use voice command to indicate selection of the card, etc. In block 604, a request is received, such as from the search device 104, to increase the specificity of a particular card. As shown in decision block 606, the computing device considers the particular card and determines whether there are more specific lower levels of detailed cards for the particular card selected. In block 608, if the particular card represents the lowest level of detail of cards for the represented event, the event information for the card may be provided. However, if there are lower level cards for the particular card, the process continues to block 610 to provide lower level cards and lower level collapsed elements in chronological order for the next time period level showing greater granularity subset of events, each lower level card representing a segment of time of its corresponding higher level card.

In decision block 612, the process determines if any more requests for cards or collapsed elements are pending. If there is an additional request, the additional request is received in block 604 and the process repeats. When there are no more requests pending, the query may be optionally saved, as shown in block 614, for future reference or to continue with the search at a later time.

Figure 7:
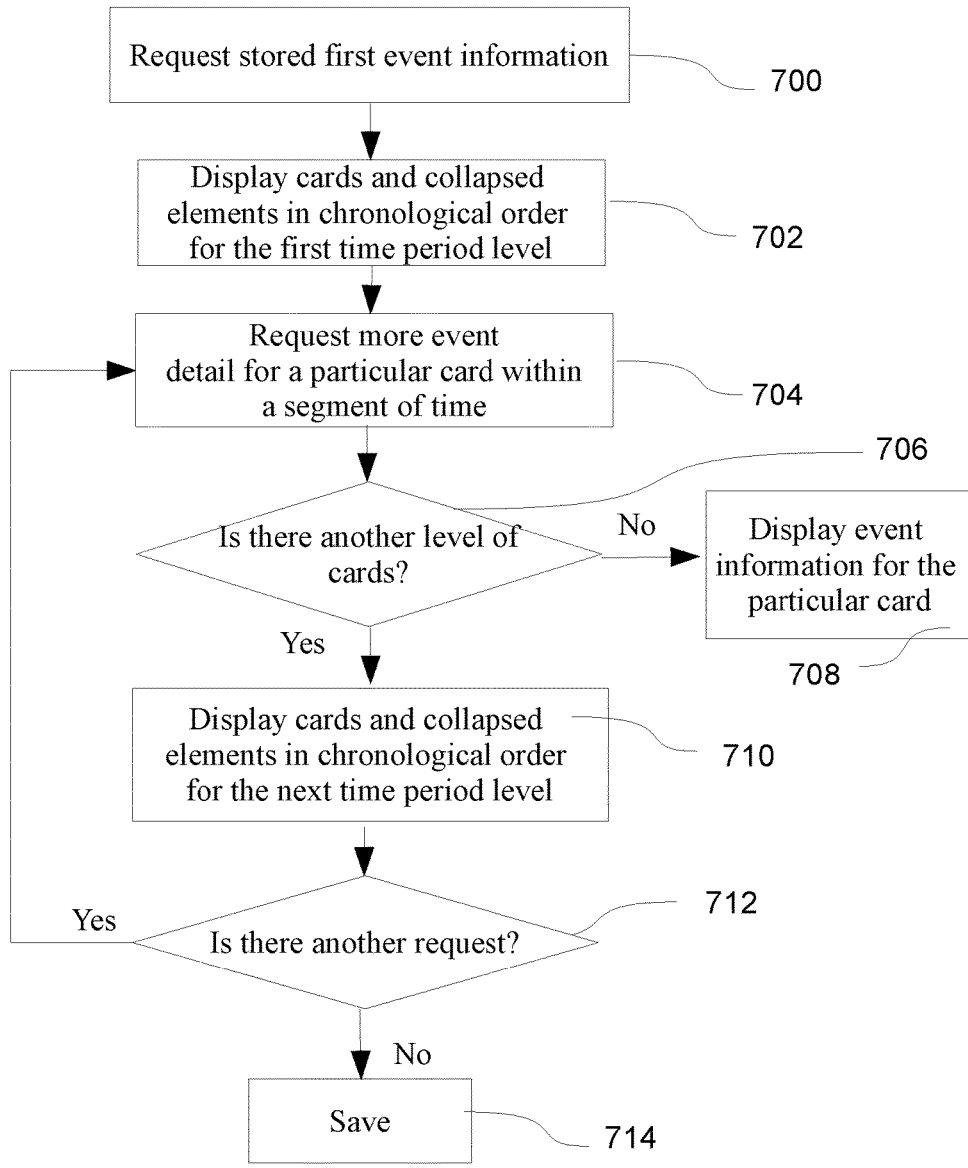
FIG. 7 is a flow diagram of example of using a search interface to navigate event information.

FIG. 7, shows by way of a flow chart, some implementations of the navigation system which may be performed by the processor of the search device 104. In block 700, a user may operate the search device to request stored event information. The request may include specific parameters for the query, such as an initial date or date range and time interval for event cards. In response, a chronological order of cards and collapsed elements may be displayed for a first time period level, as shown in block 702.

In block 704, the search device may request more event detail for a particular card to reveal cards that span a segment of time that is less than the previous period of time. Decision block 706 determines if there is another level of cards. If the particular card represents the lowest level card and there are no more event clusters, the event information is displayed as shown in block 708. If not, in block 710, the next time period level cards and collapsed elements are displayed in chronological order along a timeline of events. Optionally, in some implementations, at any displayed time period level, a user may request all of the event information to be provided for any select card or group of cards, such as by single or double tapping or clicking on a card. In decision block 712, if there is another request, then the process returns to step 704 to proceed with providing cards for the next lower level or event information. Otherwise, if there are no further requests, the query may be optionally stored, as shown in block 714.

Figure 8:
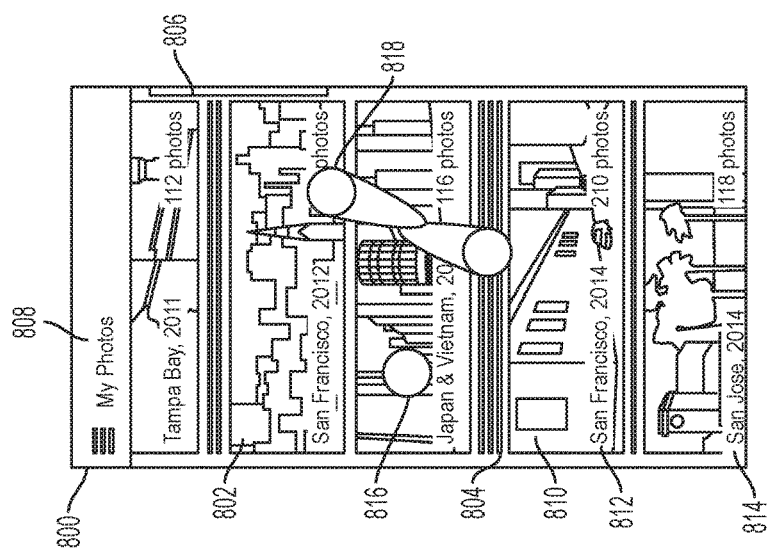
FIGS. 8 (a), (b), (c), (d), (e), (f), and (g) are illustrations of an example approach to navigating a search interface with multiple event cards.
Figure 8:
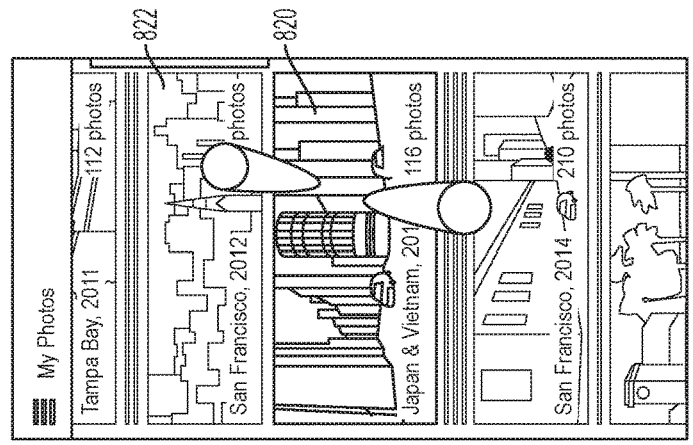
Figure 8:
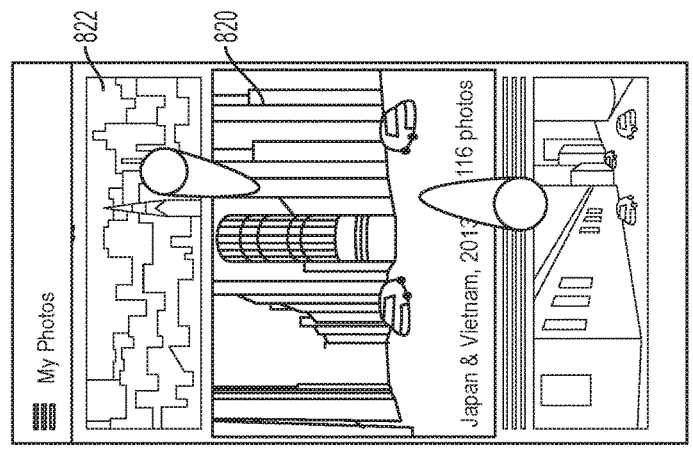

FIGS. 8 (a) through (g) show some examples sequential animation type transitions of the search interface to find event information in the form of photographs. Similar interfaces may be used to reveal other types of event information as well. The navigation system may include one or more of the example transition search interface screens shown by the FIGS. 8 (a) to (g). For example, in some implementations, the search interface may transition directly from FIG. 8 (a) to FIG. 8 (g) without animation or the transition search interface screens shown in FIGS. 8 (b) to (f). In some implementations, a user may opt to forego the animation and jump from one level to the next level or to the event information for all cards shown for a given level.

The search interface 800 may transition from one time period, higher level of events to another more detailed time period, lower level of events covering a segmented portion of time. FIG. 8 (*a*) depicts first level cards 802, collapsed elements 804, a scroll bar 806, and a title and tool bar 808. In the example interface shown, the cards 802 are displayed in chronological order in the form of a vertical list. It should be appreciated that various other chronological order arrangements of cards may be provided on the search interface. For example, the cards 802 may be arranged as a horizontal list on the interface, a grid, rectangular or other a shaped pattern, etc. In some implementations, the cards may be sized and positioned to create a frog's eye view effect in which one or more cards are emphasized.

In some implementations, the cards 802 may include a representative photograph 810, a location description 812 and date 814 of the events represented by the card 802. In FIGS. 8 (*a*) to (*g*), the cards are shown as rectangular and spanning the length of the interface. However, other shapes and dimensions of cards may be used in the search interface.

The cards may be scrollable to display other cards and collapsed elements at the time period level to view cards representing events occurring earlier or later in time. Scroll bar 806 or other display elements may enable viewing of additional cards and collapsed elements, such as a next page element (e.g., arrow, page number, entry field for page number, etc.). The position of the scroll bar along a track may also indicate the volume of cards at the time period level, as well as the volume of cards dated prior to and after the cards displayed. The scroll bar and track may run alongside the list of cards, for example the cards may be may be displayed horizontally and the scroll bar track also displayed horizontally on the display, or other patterns.

In some implementations, one or more cards associated with a time period of interest may be centrally located on the display along the chronologically ordered cards or otherwise emphasized among the other cards in the time period level. In some implementations, the cards associated with the time period of interest may be enlarged, have a different shape than the other cards, be highlighted with borders, lighting or coloring, etc. For example, a user may request a timescale to initiate the search and the cards associated with the timescale, may be emphasized.

To display a next level period of time, a user may select one or more cards and thereby request to increase specificity of a particular one or more first level cards. The selection may be by one or more screen taps and/or zoom in touch command (such as a pinching gesture) on one or more cards, or a variety of other mechanisms to make a request for a lower level of cards. The figure indicates a tap 816 with a faded circle and zoom 818 in command with faded eclipse shapes. In various implementations, the search interface may or may not include such impressions to indicate activation of a command.

FIGS. 8 (*b*) and (*c*) show example of search interface progression as one first level card 820 has been selected to expand specificity of the event information for the time period associated with the card. During the transition, the selected card 820 may become increasingly enlarged and other unselected cards 822 may gradually get pushed or slid off of the search interface screen. For cards including images, the expansion of the card may also involve cropping, depending on the image's aspect ratio. The unselected cards may also gradually become faded prior to moving off of the screen.

FIG. 8 (*d*) shows the selected card 820 enlarged to its full size during a next transition of the search interface. In some implementations, the enlarging of the particular card occurs prior to entering, e.g., sliding, of the lower level cards. However, in some implementations, lower level cards enter prior to the selected card enlarging or becoming fully enlarged. In still some implementations, the selected card does not enlarge and it is replaced with entering lower level cards.

In following animated transitions of the search interface, as shown in FIGS. 8 (*e*) and (*f*), lower level cards 824 and lower level collapsed elements 826 may gradually appear and slide into position in the interface screen. In some implementations, the next lower level cards 824 and collapsed elements 826 may move from one side of the search interface screen into the interface, such as from right to left as shown in FIG. 8 (*e*) and progressing farther into the screen as shown in FIG. 8 (*f*). In some implementations, animated sliding of lower level cards and collapsed elements may be from left to right, top to bottom, bottom to top, diagonal, and the like. In some implementations, movement of lower level cards may coincide with opposite movement of lower level cards.

The entering of lower level cards and/or higher level cards and optionally collapsed elements may also be staggered to progressively replace the higher level cards, in which one card moves into or appears on the interface occurs prior to a next card, and so on, creating a staggered effect of cards entering the interface screen. The staggered movement of cards may be at various time sequences, e.g., top first to bottom, as shown in FIG. 8 (*e*), bottom to top, or middle entering first and then top and bottom cards, scattered or random ordering of cards, etc. Where staggered movement is from one end of cards entering the interface to the other end of cards, a slanting effect may occur. As shown in FIG. 8 (*e*), the top card is farther into the screen than its adjacent lower card and so on, at any given point of the sliding movement. In other implementations, each of the next lower level cards may slide into the interface screen at the same time and the appearance of the lower level cards may not be slanted. Further to the transition of introducing a lower level of cards, the selected card 820 of the higher time period level may gradually or instantly appear faded.

As the new set of more granular event cards is introduced, the bar at the top of the interface screen may be refreshed to show the new summary of event label. Also shown in FIGS. 8 (*f*) and (*g*) is a back-up element 828 in the form of an arrow facing left. The back-up element enables a user to return to a previous time period level of cards, as shown in FIG. 8 (*a*).

FIG. 8 (*g*) illustrates an example search interface with a completed transition of next lower level cards 824 and collapsed elements 826. The next (or second) level cards may include a representative photograph 828, a location description 830 and general date of the events represented by the card 832. One or more of the second level cards may be further selected to surface next level cards associated with a more detailed time period level of events and covering a smaller segment of time.

The event information to which a card relates may be revealed by a user requesting the underlying event information for any given card, such as by single or double tapping or clicking on a card. In some implementations, as shown by the example search interfaces 900 in FIGS. 9 (*a*) to (*e*), event information may be presented once one or more cards are selected from a lowest level of cards.

Figure 9A:
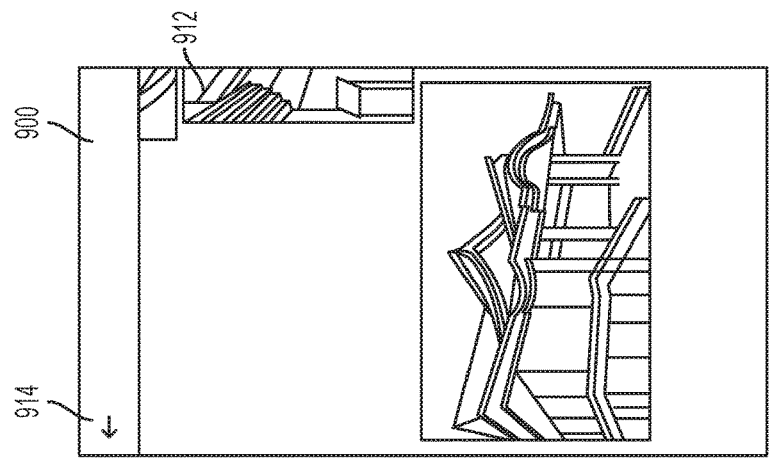
FIGS. 9 (a), (b), (c), (d), and (e) are illustrations of an example approach to navigating a search interface with search results of event information.
Figure 9B:
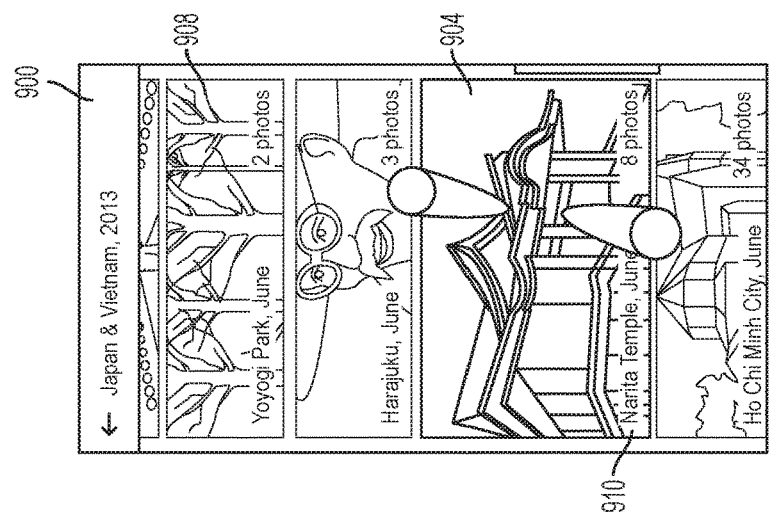
Figure 9C:
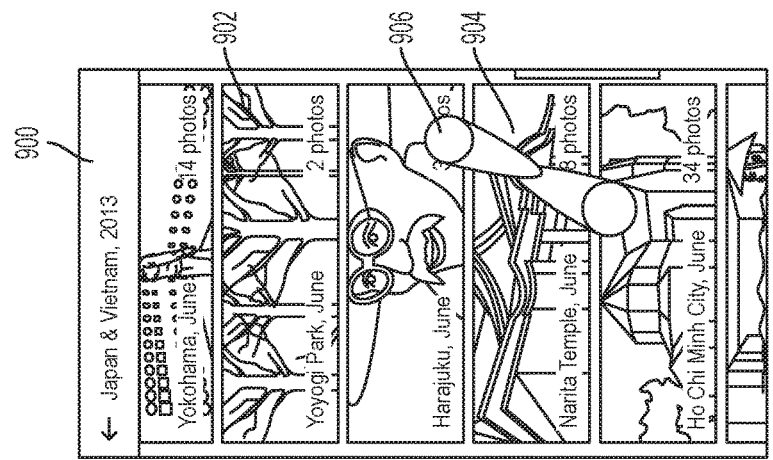
Figure 9:
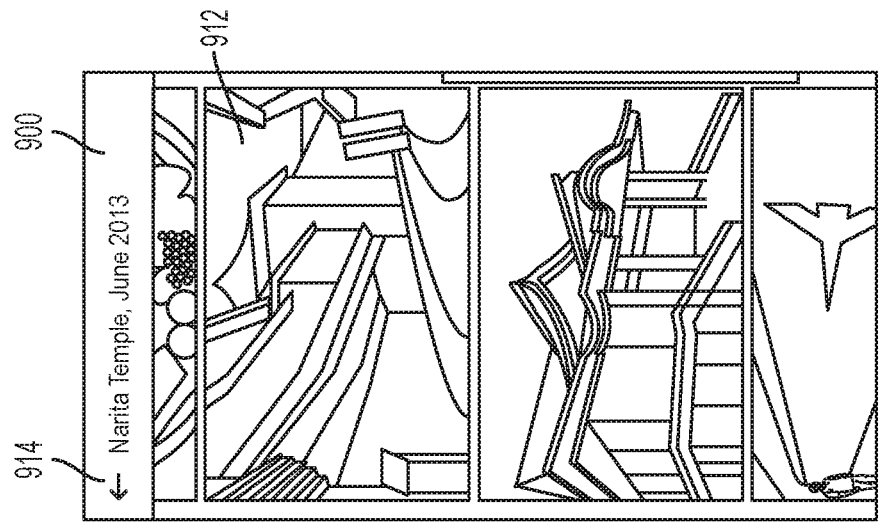
Figure 9:
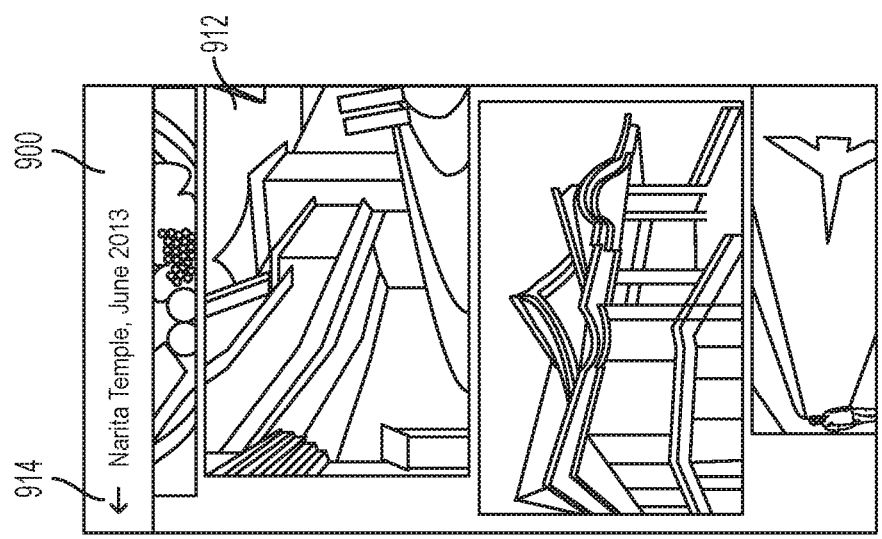

In FIG. 9 (*a*) a scrollable list of cards 902 are shown in chronological order for a lowest level. One card 904 may be selected by a zoom in command, which for illustration purposes, is represented by light eclipse shapes 906. In FIG.

9 (b) during a next transition of the search interface 900, the selected card 904 is enlarged to a defined size, which may be less than the full size of the search interface. In this example, the card includes a representative photograph in the cluster of event information. The text 910, e.g., location and date, on the face of the selected card 904, may become faded. Further to the animated transition, the unselected cards 908 also may gradually fade from visibility and become pushed or slid above and below the enlarged selected card.

In FIGS. 9 (c) and (d), as described above with regards to next level cards, the search interface 900 may transition to gradually move event information 912 from one side, e.g., right to left, into the screen and the movement may also be staggered, e.g., from top to bottom. The transition may be complete with the surfacing of the event information 912, which may take the form of a scrollable list, as shown in FIG. 9 (e). In some implementations, the event information, e.g., photograph, may be visible discernable form the cards that represent the photographs, such as by larger size, different aspect ratio and optional lack of labels. At any point during the transitions between levels, a user may request return to a previous level with the back-up element 914.

The retrieved event information may be manipulated in various ways by the search device. For example, the event information may be saved, shared with social networking sites, emailed, edited, etc.

Figure 10A:
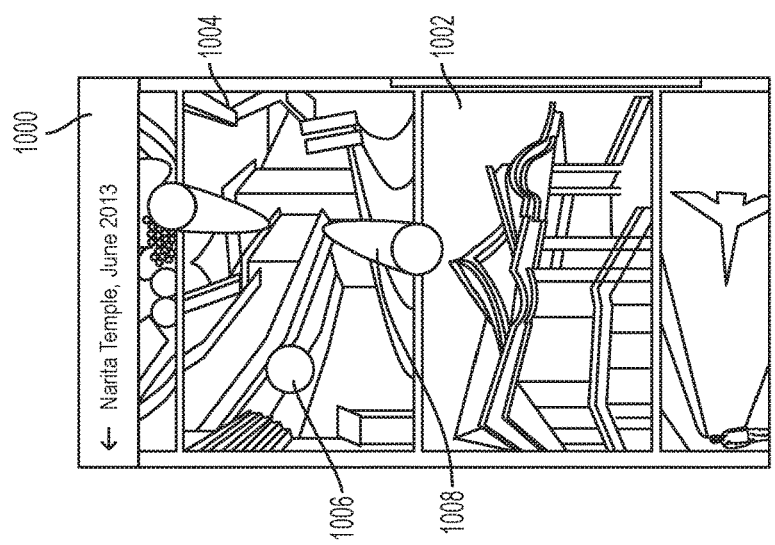
FIGS. 10 (a), (b) and (c) are illustrations of an example approach to navigating a search interface with select event information.
Figure 10B:
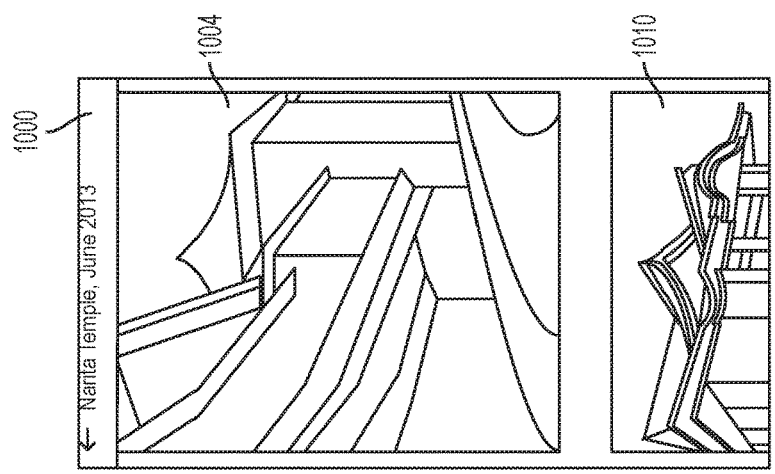
Figure 10C:
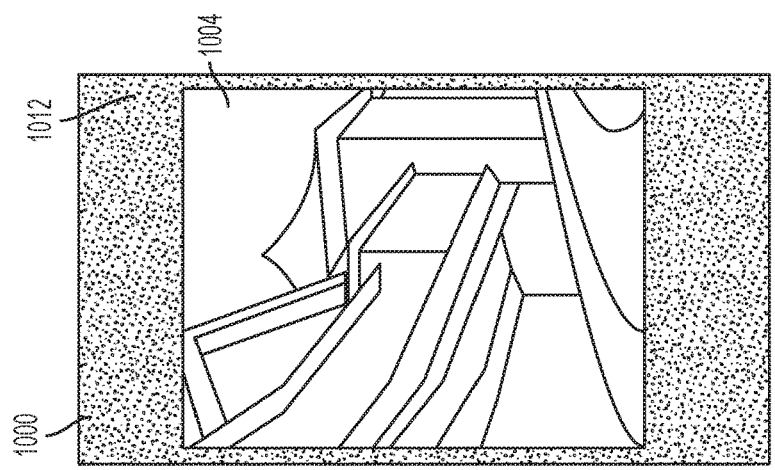

FIGS. 10 (a) to (c) illustrate selection of one event information 1004 among the list of event information 1002 on a search interface 1000. As shown in FIG. 10 (a), the user may tap 1006 and/or spread fingers to zoom in 1008 on any event information to request enlarging of the selected event information 1004. As shown in the transition frame of the search interface 1000 in FIG. 10 (b), the selected information 1004 becomes enlarged, pushing unselected information 1010 from the screen. In the search interface 1000 shown in FIG. 10 (c), the selected information 1004 may enlarge to a full size. Optionally, borders 1012 may be included to frame the selected information.

Figure 11:
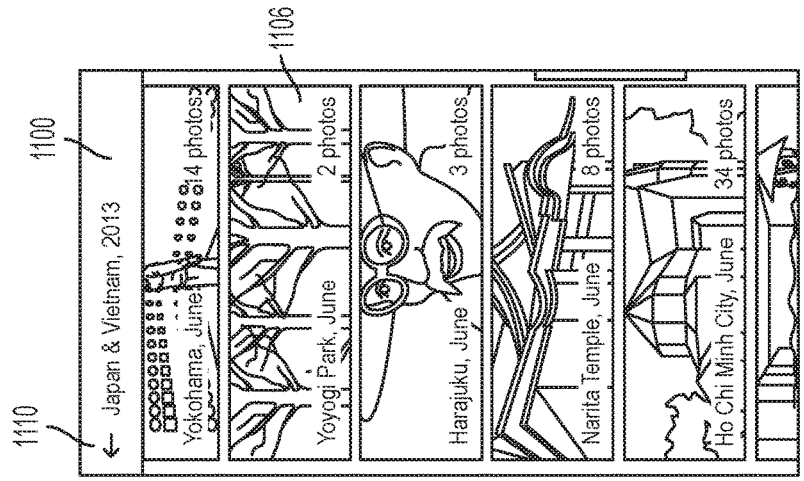
FIGS. 11 (a), (b) and (c) are illustrations of an example approach to navigating a search interface with collapsed elements.
Figure 11:
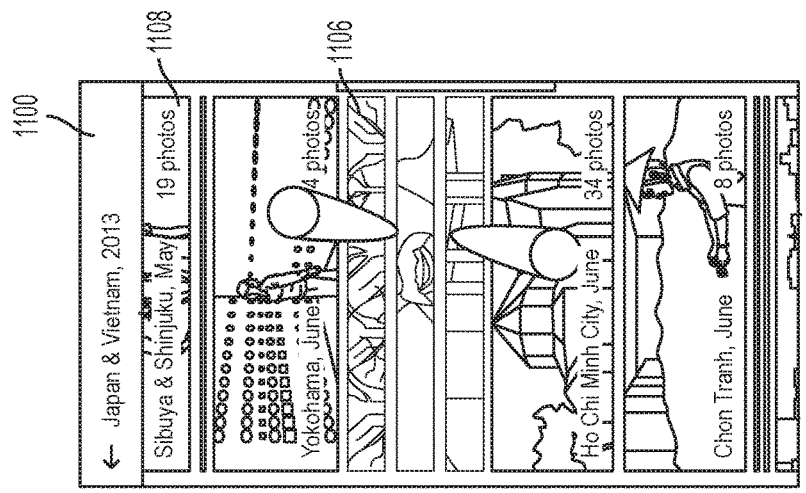
Figure 11:
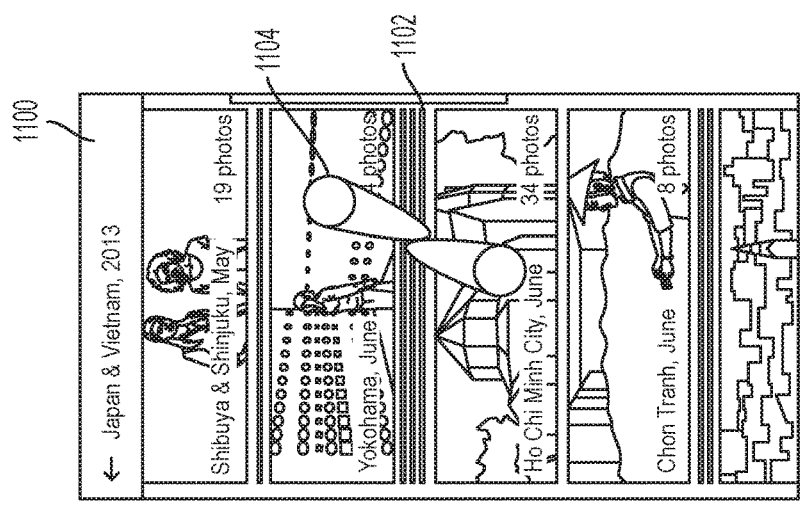

As illustrated in FIGS. 11 (a) to (c), a user of the search interface 1100 may provide a user with an option to view cards for less significant events through collapsed elements 1102. Events that have been characterized as less significant by the navigation system may be represented by the collapsed elements 1102. In some implementations, less significant events may be grouped into one collapsed element. Further to some implementations, there may be a limit to the number of collapsed elements, e.g., three, inserted between two cards. For example, as shown in FIG. 11 (a), a horizontal line may be chronologically inserted into the list of cards for each, or more than one, less significant event. A user may zoom in 1104, or otherwise select, one or more of the collapsed elements.

FIG. 11 (b) shows a transitional phase search interface 1100 in which three selected collapsed elements gradually expand to reveal cards 1106 for the events associated with the collapsed elements. Unselected cards 1108 may be pushed away by the expanding collapsed elements.

In FIG. 11 (c), the search interface 1100 shows fully surfaced collapsed elements. Each of the selected collapsed elements has been replaced by its associated event cards 1106. The events of the surfaced collapsed elements may be re-categorized and stored as significant events. Back-up element 1110 may be provided to return to the search interface of FIG. 11 (a) in which the collapsed elements resume.

Figure 12:
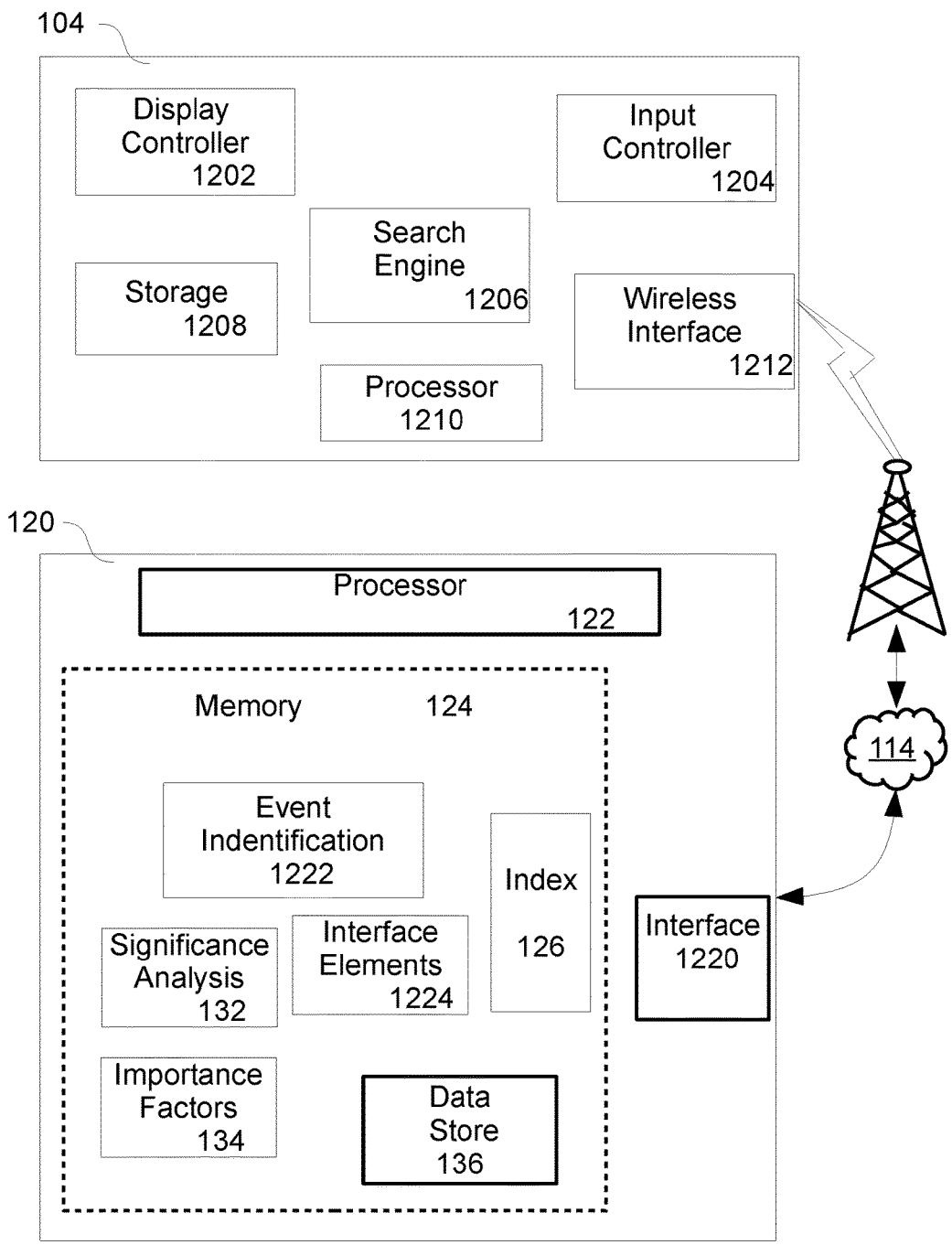
FIG. 12 is a schematic diagram illustrating selected example components of a computing device that implements the navigation system; all in accordance with the present disclosure.

In FIG. 12, the search device 104 and the computing device 120 and at least some of their components are shown, according to some implementation of the navigation system. The search device 104 may include one or more controllers, such as a display controller 1202 to direct the display on the display screen 106, input controller 1204 to direct input elements and a processor 1210. The search engine 1206 receives queries for events and event information, and in response, returns the search interface. Often, a search device 104 may include a variety of other applications as well. The search device 104 may also include various storage, such as storage 1208 in which the event information may be stored.

The search device 104 communicates through network 116 from wireless interface 1212 to computing device 120 at its interface 1220. The computing device 120 may include one or more processors 122 and memory 124. The processor 122 may process instruction for execution within the computing device 120 including instructions stored in memory 124 or on the data store 132. The processor 122 may coordinate computing device components, e.g., applications, wireless or wired communication through interfaces, etc. In some implementations, multiple processors and buses may be used.

The processor 122 and may be implemented as a chipset of chips that include separate and multiple analog digital processors. The processor may also be implemented using various architectures. For example, the processor 122 may be a CISC (Complex Instruction Set Computer) processor, RISC (Reduced Instruction Set Computer) processor or MISC (Minimal Instruction Set Computer) processor.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems.

The memory 124 stores information within the computing device 120. The memory 124 may be any suitable data storage, memory and/or non-transitory computer-readable storage media, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

The one or more processors 122 and the memory 124 may implement a significance analysis module 132, an importance factors unit 134, event identification module 1222 to cluster event information into discrete events, data store 136 and an interface elements module 1224 to create and store cards and collapsed elements.

Data store 136 may keep applications and other data. Data store may also be employed to store the event information. At least a portion of the information may also be stored on a disk drive or other computer readable storage device (not shown) within the computing device 120. Such storage devices include a floppy disk device, a hard disk device, an optical disk device, or a tape device, a flash memory or other similar solid state memory device, or an array of devices.

A computer program, also referred to as programs, software, software applications or code, may also contain instructions that, when executed, perform one or more methods, such as those described herein. The computer program may be tangibly embodied in an information carrier such as computer or machine readable medium, for example, the memory 124, storage device or memory on processor 122. A machine readable medium is any computer program product, apparatus or device used to provide machine instructions or data to a programmable processor.

The computing device 120 may be implemented in a number of different forms. In some implementations, the computing device 120 may be substituted with one or more networked servers, such as servers in a cloud computing network. In some implementations, it may be implemented in a personal computer such as a laptop computer.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time. A number of implementations have been described. Features described with conditional language may describe implementations that are optional. The functional blocks, methods, devices, and systems described in the present disclosure may be integrated or divided into different combinations of systems, devices, and functional blocks as would be known to those skilled in the art.

The systems and methods discussed herein do not require collection or usage of user personal information. In situations in which certain implementations discussed herein may collect or use personal information about users (e.g. user data, information about a user's social network, user's location, user's biometric information, user's activities and demographic information), user are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's geographic location may be generalized to a larger region so that the user's particular location cannot be determined.

Although the description has been described with respect to particular implementations thereof, these particular implementations are merely illustrative, and not restrictive. Concepts illustrated in the examples may be applied to other examples and implementations. Thus, various modifications may be made without departing from the spirit and scope of this disclosure and other implementations are within the scope of the following claims.

What is claimed is:

1. A computer implemented method comprising:
providing a first set of images and a second set of images;
providing one or more importance factors for determining levels of significance for levels of cards that represent sets of images including the first set of images and the second set of images;
determining at least one updated importance factor of the one or more importance factors that changes a card to a less significant level;
in response to determining the at least one updated importance factor:
  determining a plurality of first level cards that each represent the first set of images and are associated with a first time period, wherein the plurality of first level cards meet a first threshold value associated with a first level significance based on the at least one updated importance factor, and
  determining a plurality of second level cards that includes the changed card, each of the plurality of second level cards representing the second set of image and are associated with a second time period that is a segment of the first time period, wherein the plurality of second level cards are associated with a second level significance meeting a second threshold value, wherein the second set of images is a subset of the first set of images;
providing, by a computing device, for display in chronological order, two or more of the plurality of first level cards;
receiving, by the computing device, a request to increase specificity of a particular first level card of the plurality of first level cards; and
providing, by the computing device, for display in chronological order, two or more of the plurality of second level cards.

2. The method of claim 1, further including:
receiving instructions to display at least one of the second set of images from two or more of the plurality of second level cards; and
providing, by the computing device, for display, the at least one of the second set of images from the two or more of the plurality of second level cards.

3. The method of claim 1, further including, providing by the computing device, for display in the chronological order of the plurality of first level cards, a collapsed element that represents particular images of the first set of images for events with less significance than the first level significance, wherein the collapsed element is associated with the first time period.

4. The method of claim 3, further including, receiving a request to increase specificity of the collapsed element and, in response to the request, replacing the collapsed element with an additional first level card.

5. The method of claim 1, wherein the chronological order of the plurality of first level cards is scrollable to display additional first level cards.

6. A computer implemented method comprising:
providing a first set of images and a second set of images;
providing one or more importance factors for determining levels of significance for levels of cards that represent sets of images including the first set of images and the second set of images;
determining at least one updated importance factor of the one or more importance factors that changes a card to a less significant level;
in response to determining the at least one updated importance factor:
  determining a plurality of first level cards that each represent the first set of images and are associated with a first time period, wherein the plurality of first level cards meet a first threshold value associated with a first level significance based on the at least one updated importance factor, and determining a plurality of second level cards that includes the changed card, each of the plurality of second level cards representing the second set of image and are associated with a second time period that is a segment of the first time period, wherein the plurality of second level cards are associated with a second level significance meeting a second threshold value, wherein the second set of images is a subset of the first set of images;

displaying, by a user computing device, in chronological order, two or more of the plurality of first level cards;

requesting, by the user computing device, an increase in specificity of a particular first level card of the plurality of first level cards; and displaying through a transition period, by the user computing device, in chronological order, two or more of the plurality of second level cards.

7. The method of claim 6, further including:
requesting, by the user computing device, to display at least one of the second set of images from at least one select plurality of second level cards; and
displaying the at least one of the second set of images from the plurality of second level cards.

8. The method of claim 6, further including displaying by the user computing device, in the chronological order of the plurality of first level cards, a collapsed element that represents particular images of the first set of images for events with less significance than the first level significance, dynamically determined based on one or more importance factors, wherein the collapsed element is associated with the first time period.

9. The method of claim 8, further including requesting, by the user computing device, to increase specificity of the collapsed element and, in response to the request, replacing the collapsed element with an additional first level card.

10. The method of claim 6, further including selecting the particular first level card by a user spread, pinch or tap gesture on a user interface.

11. The method of claim 6, wherein during the transition period, portions of the plurality of second level cards progressively replace portions of the plurality of first level cards.

12. The method of claim 11, wherein replacing of the plurality of first level cards is by an animation of sliding of the portions of the plurality of second level cards.

13. A non-transitory computer-readable medium storing instructions that, when executed by one or more processors, cause the one or more processors to:
provide a first set of images and a second set of images;
provide one or more importance factors for determining levels of significance for levels of cards that represent sets of images including the first set of images and the second set of images;
determine at least one updated importance factor of the one or more importance factors that changes a card to a less significant level;
in response to determining the at least one updated importance factor:
determine a plurality of first level cards that each represent the first set of images and are associated with a first time period, wherein the plurality of first level cards meet a first threshold value associated with a first level significance based on the at least one updated importance factor, and
determine a plurality of second level cards that includes the changed card, each of the plurality of second level cards representing the second set of image and are associated with a second time period that is a segment of the first time period, wherein the plurality of second level cards are associated with a second level significance meeting a second threshold value, wherein the second set of images is a subset of the first set of images;

provide, by a computing device, for display in chronological order, two or more of the plurality of first level cards;

receive, by the computing device, a request to increase specificity of a particular first level card of the plurality of first level cards; and provide, by the computing device, for display in chronological order, two or more of the plurality of second level cards.

14. The computer-readable medium of claim 13, further including:
receiving instructions to display at least one of the second set of images from two or more of the plurality of second level cards; and
providing, by the computing device, for display, the at least one of the second set of images from the two or more of the plurality of second level cards.

15. The computer-readable medium of claim 13, further including providing by the computing device, for display in the chronological order of the plurality of first level cards, a collapsed element that represents particular images of the first set of images for events with less significance than the first level significance, dynamically determined based on one or more importance factors, wherein the collapsed element is associated with the first time period.

16. The computer-readable medium of claim 15, further including receiving a request from a user to increase specificity of the collapsed element and, in response to the request, replacing the collapsed element with an additional first level card.

17. The computer-readable medium of claim 13, wherein the chronological order of the plurality of first level cards is scrollable to display additional first level cards.

18. The computer-readable medium of claim 13, wherein the plurality of second level cards is provided for display as an animation of the plurality of first level cards being progressively replaced by the one or more of the plurality of second level cards.

19. A system comprising:
one or more processors; and
a memory coupled to the processors, the memory configured to store instructions that cause the one or more processors to:
provide a first set of images and a second set of images;
provide one or more importance factors for determining levels of significance for levels of cards that represent sets of images including the first set of images and the second set of images;
determine at least one updated importance factor of the one or more importance factors that changes a card to a less significant level;
in response to determining the at least one updated importance factor:
determine a plurality of first level cards that each represent the first set of images and are associated with a first time period, wherein the plurality of first level cards meet a first threshold value associated with a first level significance based on the at least one updated importance factor, and determine a plurality of second level cards that includes the changed card, each of the plurality of second level cards representing the second set of image and are associated with a second time period that is a segment of the first time period, wherein the plurality of second level cards are associated with a second level significance meeting a second threshold value, wherein the second set of images is a subset of the first set of images;

provide for display in chronological order, two or more of the plurality of first level cards receive a request to increase specificity of a particular first level of the plurality of first level cards; and provide for display in chronological order, two or more of the plurality of second level cards.

20. The system of claim 19, wherein the instructions further cause the one or more processors to:

receive instructions to display at least one of the second set of images from two or more of the plurality of second level cards; and provide for display, the at least one of the second set of images from the two or more of the plurality of second level cards.

21. The system of claim 19, wherein the instructions further cause the one or more processors to:

provide for display in the chronological order of the plurality of first level cards, a collapsed element that represents particular images of the first set of images for events with less significance than the first level significance, dynamically determined based on one or more importance factors, wherein the collapsed element is associated with the first time period.

22. The system of claim 21, wherein the instructions further cause the one or more processors to:

receive a request from a user to increase specificity of the collapsed element and, in response to the request, replace the collapsed element with an additional first level card.

23. The system of claim 19, wherein the chronological order of the plurality of first level cards is scrollable to display additional first level cards.

24. The system of claim 19, wherein the plurality of second level cards is provided for display as an animation of the plurality of first level cards being progressively replaced by the one or more of the plurality of second level cards.

* * * * *